(12) United States Patent
Song et al.

(10) Patent No.: US 12,246,392 B2
(45) Date of Patent: Mar. 11, 2025

(54) DEPOSITION HEAD FOR FRICTION STIR ADDITIVE MANUFACTURING DEVICES AND METHODS

(71) Applicant: Blue Origin, LLC, Kent, WA (US)

(72) Inventors: Weidong Song, Woodinville, WA (US); Michael Brennan, Renton, WA (US); Alex Langenstein, Seattle, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 67 days.

(21) Appl. No.: 18/192,998

(22) Filed: Mar. 30, 2023

(65) Prior Publication Data

US 2024/0326156 A1    Oct. 3, 2024

(51) Int. Cl.
*B23K 20/12* (2006.01)
*B23K 103/20* (2006.01)

(52) U.S. Cl.
CPC ........ *B23K 20/128* (2013.01); *B23K 20/1255* (2013.01); *B23K 2103/20* (2018.08)

(58) Field of Classification Search
CPC .............. B23K 20/1215; B23K 20/129; B23K 2103/10–12; B23K 20/122–128;

(Continued)

(56) References Cited

U.S. PATENT DOCUMENTS 3,069,847 A    12/1962    Vest, Jr.
3,585,800 A    6/1971    Kuntz
(Continued)

FOREIGN PATENT DOCUMENTS

AU    2018359514 B2    10/2018
AU    2018359514 A1    5/2019
(Continued)

OTHER PUBLICATIONS

Wagner, J et al. "Method for Fabricating Metallic Panels with Deep Stiffener Sections" https://www.techbriefs.com/component/content/article/23860-lar-17976-1, Feb. 1, 2016, 5 pages.

(Continued)

*Primary Examiner* — Kiley S Stoner
(74) *Attorney, Agent, or Firm* — Knobbe, Martens, Olson & Bear, LLP

(57) ABSTRACT

A friction stir additive manufacturing device configured to join a first work-piece and a second work-piece is provided. In one aspect, the device includes a rotating spindle configured to deposit a filler material over a weld line as the device is advanced along an interface between the first work-piece and the second work-piece. The device also includes a deposition head configured to receive at least a portion of the spindle, the deposition head configured to remain stationary relative to the rotating spindle. The deposition head includes a first semi-cylindrical portion having an inner radius and an outer radius relative to a first axis, and a second semi-cylindrical portion having an inner radius and an outer radius relative to a second axis that is perpendicular to the first axis. The second semi-cylindrical portion can include a chamfered inner surface configured to define a weld profile.

16 Claims, 11 Drawing Sheets

(58) Field of Classification Search
CPC ........ B23K 2101/001; B23K 2101/006; B23K 2101/04–125; B23K 2101/22; B23K 2103/20–22; B33Y 10/00; B33Y 80/00
USPC .............................................. 228/112.1, 2.1
See application file for complete search history.

(56) References Cited

U.S. PATENT DOCUMENTS

| | | | |
|---|---|---|---|
| 5,233,755 A | 8/1993 | Vandendriessche |
| 5,697,511 A | 12/1997 | Bampton |
| 5,971,252 A | 10/1999 | Rosen et al. |
| 6,050,474 A | 4/2000 | Aota et al. |
| 6,151,887 A | 11/2000 | Hadin |
| 6,536,651 B2 | 3/2003 | Ezumi et al. |
| 6,543,671 B2 | 4/2003 | Hatten et al. |
| 6,606,851 B1 | 8/2003 | Herdy, Jr. |
| 6,669,075 B2 | 12/2003 | Colligan |
| 6,779,707 B2 | 8/2004 | Dracup et al. |
| 7,090,112 B2 | 8/2006 | Masingale |
| 7,093,470 B2 | 8/2006 | El-Soudani |
| 7,097,091 B2 | 8/2006 | Okamura et al. |
| 7,128,532 B2 | 10/2006 | Petervary |
| 7,354,657 B2 | 4/2008 | Mishra |
| 7,430,888 B2 | 10/2008 | Osame |
| 7,556,187 B2 | 7/2009 | Sunahara et al. |
| 7,735,223 B2 | 6/2010 | Clark |
| 7,854,958 B2 | 12/2010 | Kramer |
| 7,866,532 B1 | 1/2011 | Potter et al. |
| 8,079,126 B2 | 12/2011 | Bampton et al. |
| 8,114,474 B1 | 2/2012 | Dudt et al. |
| 8,141,764 B1 | 3/2012 | Potter et al. |
| 8,272,424 B2 | 9/2012 | Short |
| 8,316,916 B2 | 11/2012 | Heinrich et al. |
| 8,348,136 B1 | 1/2013 | Potter et al. |
| 8,397,974 B2 | 3/2013 | Schultz et al. |
| 8,632,850 B2 | 1/2014 | Schultz et al. |
| 8,636,194 B2 | 1/2014 | Schultz et al. |
| 8,710,144 B2 | 4/2014 | Hesse et al. |
| 8,782,892 B2 | 7/2014 | Seo et al. |
| 8,875,976 B2 | 11/2014 | Schultz et al. |
| 8,893,954 B2 | 11/2014 | Schultz et al. |
| 9,027,378 B2 | 5/2015 | Crump et al. |
| 9,101,979 B2 | 8/2015 | Hofmann et al. |
| 9,205,578 B2 | 12/2015 | Schultz et al. |
| 9,233,438 B2 | 1/2016 | Phelan et al. |
| 9,238,283 B2 | 1/2016 | Gniesmer |
| 9,266,191 B2 | 2/2016 | Kandasamy et al. |
| 9,511,445 B2 | 12/2016 | Kandasamy |
| 9,511,446 B2 | 12/2016 | Kandasamy et al. |
| 9,555,580 B1 | 1/2017 | Dykstra et al. |
| 9,555,871 B2 | 1/2017 | Grip et al. |
| 9,610,650 B2 | 4/2017 | Hofmann et al. |
| 9,611,803 B2 | 4/2017 | Vieira De Morais et al. |
| 9,643,279 B2 | 5/2017 | Schultz et al. |
| 9,757,802 B2 | 9/2017 | Cui et al. |
| 9,862,054 B2 | 1/2018 | Kandasamy et al. |
| 9,931,789 B2 | 4/2018 | Wiesner et al. |
| 9,937,587 B2 | 4/2018 | Kou et al. |
| 9,943,929 B2 | 4/2018 | Schultz et al. |
| 10,011,089 B2 | 7/2018 | Lyons et al. |
| 10,022,796 B2 | 7/2018 | Wang |
| 10,105,790 B2 | 10/2018 | Kandasamy |
| 10,254,499 B1 | 4/2019 | Cohen et al. |
| 10,259,041 B2 | 4/2019 | Gessler et al. |
| 10,279,422 B2 | 5/2019 | Werz et al. |
| 10,335,854 B2 | 7/2019 | Wiesner et al. |
| 10,500,674 B2 | 12/2019 | Kandasamy et al. |
| 10,543,529 B2 | 1/2020 | Schwarze et al. |
| 10,583,519 B2 | 3/2020 | Litwinski |
| 10,583,631 B2 | 3/2020 | Kandasamy et al. |
| 10,625,374 B2 | 4/2020 | Schwarze |
| 10,670,019 B2 | 6/2020 | Zinniel et al. |
| 10,724,561 B2 | 7/2020 | Amira et al. |
| 10,796,727 B1 | 12/2020 | Coffey et al. |
| 10,857,596 B1 | 12/2020 | Mittendorf et al. |
| 10,906,127 B2 | 2/2021 | Seo et al. |
| 10,953,489 B2 | 3/2021 | Fröhlke et al. |
| 11,014,292 B2 | 5/2021 | Marchione |
| 11,077,607 B2 | 8/2021 | Snyder et al. |
| 11,219,951 B2 | 1/2022 | Matthews et al. |
| 11,229,972 B2 | 1/2022 | Mosaki et al. |
| 11,260,468 B2 | 3/2022 | Frank et al. |
| 11,311,959 B2 | 4/2022 | Hardwick et al. |
| 11,415,380 B2 | 8/2022 | Chipko et al. |
| 11,981,460 B2 | 5/2024 | Muceus et al. |
| 2002/0014070 A1 | 2/2002 | Stechman, Jr. et al. |
| 2003/0042292 A1 | 3/2003 | Hatten et al. |
| 2003/0192941 A1 | 10/2003 | Ishida et al. |
| 2004/0074949 A1 | 4/2004 | Narita et al. |
| 2004/0107019 A1 | 6/2004 | Keshavmurthy et al. |
| 2004/0155094 A1 | 8/2004 | Okamoto et al. |
| 2005/0035173 A1 | 2/2005 | Steel et al. |
| 2005/0242158 A1 | 11/2005 | Bolser |
| 2005/0279810 A1 | 12/2005 | Stol et al. |
| 2006/0102699 A1 | 5/2006 | Burton et al. |
| 2006/0169741 A1 | 8/2006 | Smith et al. |
| 2006/0289604 A1 | 12/2006 | Zettler et al. |
| 2007/0152015 A1 | 7/2007 | Burton et al. |
| 2007/0158343 A1 | 7/2007 | Shimada et al. |
| 2007/0194051 A1 | 8/2007 | Bakken et al. |
| 2007/0199978 A1 | 8/2007 | Ezumi |
| 2008/0096038 A1 | 4/2008 | Nagano |
| 2008/0128473 A1 | 6/2008 | Zhou et al. |
| 2009/0188109 A1 | 7/2009 | Bampton et al. |
| 2010/0140321 A1 | 6/2010 | Eller et al. |
| 2010/0242843 A1 | 9/2010 | Peretti et al. |
| 2010/0252169 A1 | 10/2010 | Feng et al. |
| 2010/0285207 A1 | 11/2010 | Creehan et al. |
| 2011/0062219 A1 | 3/2011 | Bezaire et al. |
| 2011/0262695 A1 | 10/2011 | Lee et al. |
| 2011/0266330 A1 | 11/2011 | Bruck et al. |
| 2011/0315367 A1 | 12/2011 | Romero et al. |
| 2012/0009339 A1 | 1/2012 | Creehan et al. |
| 2012/0058359 A1 | 3/2012 | Kingston et al. |
| 2012/0073732 A1 | 3/2012 | Perlman |
| 2012/0273555 A1 | 11/2012 | Flak et al. |
| 2012/0279441 A1 | 11/2012 | Creehan et al. |
| 2012/0279442 A1* | 11/2012 | Creehan .................. C23C 26/00 228/2.1 |
| 2013/0056912 A1 | 3/2013 | O'Neill et al. |
| 2013/0068825 A1 | 3/2013 | Rosal et al. |
| 2014/0130736 A1 | 5/2014 | Schultz et al. |
| 2014/0134325 A1 | 5/2014 | Schultz et al. |
| 2014/0165399 A1 | 6/2014 | Seo et al. |
| 2014/0174344 A1 | 6/2014 | Scuhltz et al. |
| 2014/0274726 A1 | 9/2014 | Sugimoto et al. |
| 2015/0079306 A1 | 3/2015 | Schoeneborn et al. |
| 2015/0165546 A1* | 6/2015 | Kandasamy ......... B23K 20/128 228/2.1 |
| 2015/0321289 A1 | 11/2015 | Bruck et al. |
| 2016/0074958 A1 | 3/2016 | Kandasamy et al. |
| 2016/0075059 A1 | 3/2016 | Williams |
| 2016/0090848 A1 | 3/2016 | Engeli et al. |
| 2016/0107262 A1 | 4/2016 | Schultz et al. |
| 2016/0169012 A1 | 6/2016 | Dacunha et al. |
| 2016/0175981 A1* | 6/2016 | Kandasamy ....... B23K 20/1295 228/114.5 |
| 2016/0175982 A1 | 6/2016 | Kandasamy et al. |
| 2016/0258298 A1 | 9/2016 | Channel et al. |
| 2016/0363390 A1 | 12/2016 | Karlen et al. |
| 2017/0022615 A1 | 1/2017 | Arndt et al. |
| 2017/0043429 A1 | 2/2017 | Kandasamy et al. |
| 2017/0057204 A1 | 3/2017 | Kandasamy et al. |
| 2017/0080519 A1 | 3/2017 | Atin et al. |
| 2017/0150602 A1 | 5/2017 | Johnston et al. |
| 2017/0197274 A1 | 7/2017 | Steel et al. |
| 2017/0216962 A1 | 8/2017 | Schultz et al. |
| 2017/0284206 A1 | 10/2017 | Roberts et al. |
| 2017/0291221 A1 | 10/2017 | Swank et al. |
| 2017/0299120 A1 | 10/2017 | Stachulla et al. |
| 2017/0312850 A1 | 11/2017 | Werz et al. |
| 2018/0085849 A1 | 3/2018 | Kandasamy et al. |
| 2018/0126636 A1 | 5/2018 | Jang |
| 2018/0296343 A1 | 10/2018 | Wei |

(56) References Cited

U.S. PATENT DOCUMENTS

| | | | |
|---|---|---|---|
| 2018/0361501 A1 | 12/2018 | Hardwick et al. | |
| 2019/0054534 A1 | 2/2019 | Norton et al. | |
| 2019/0168304 A1 | 6/2019 | Krol et al. | |
| 2019/0193194 A1 | 6/2019 | Grong et al. | |
| 2019/0217508 A1 | 7/2019 | McGinnis et al. | |
| 2019/0299290 A1 | 10/2019 | Kuhns et al. | |
| 2019/0388128 A1 | 12/2019 | Wilson et al. | |
| 2020/0016687 A1 | 1/2020 | Whalen et al. | |
| 2020/0047279 A1 | 2/2020 | Misak | |
| 2020/0063242 A1 | 2/2020 | Anglés | |
| 2020/0101559 A1 | 4/2020 | Rose et al. | |
| 2020/0180297 A1 | 6/2020 | Carter et al. | |
| 2020/0189025 A1* | 6/2020 | Rodriguez | B23K 20/22 |
| 2020/0198046 A1 | 6/2020 | Imaizumi et al. | |
| 2020/0209107 A1 | 7/2020 | Ream et al. | |
| 2020/0247058 A1 | 8/2020 | Flitsch et al. | |
| 2020/0262001 A1 | 8/2020 | Uetani | |
| 2020/0290127 A1 | 9/2020 | Berglund et al. | |
| 2020/0306869 A1 | 10/2020 | Hardwick et al. | |
| 2020/0332421 A1 | 10/2020 | Jahdie et al. | |
| 2020/0338639 A1 | 10/2020 | Friesth | |
| 2021/0008658 A1 | 1/2021 | Frank et al. | |
| 2021/0053283 A1 | 2/2021 | Liu et al. | |
| 2021/0069778 A1 | 3/2021 | Redding et al. | |
| 2021/0078258 A1 | 3/2021 | Lalande et al. | |
| 2021/0180165 A1 | 6/2021 | Pasebani et al. | |
| 2021/0245293 A1 | 8/2021 | Hardwick et al. | |
| 2021/0308937 A1 | 10/2021 | Broach et al. | |
| 2021/0379664 A1 | 12/2021 | Gibson et al. | |
| 2021/0387253 A1 | 12/2021 | Schweizer et al. | |
| 2022/0023821 A1 | 1/2022 | Aimone et al. | |
| 2022/0049331 A1 | 2/2022 | Anglés | |
| 2022/0080522 A1 | 3/2022 | Cox et al. | |
| 2022/0176451 A1 | 6/2022 | Schweizer et al. | |
| 2022/0281005 A1 | 9/2022 | Kandasamy | |
| 2022/0388091 A1 | 12/2022 | Norman et al. | |
| 2023/0146110 A1 | 5/2023 | Allison et al. | |
| 2023/0356322 A1 | 11/2023 | Haynie et al. | |
| 2024/0100624 A1* | 3/2024 | Hardwick | B23K 20/124 |
| 2024/0109245 A1 | 4/2024 | Lalande et al. | |
| 2024/0149373 A1 | 5/2024 | Munn et al. | |
| 2024/0326155 A1* | 10/2024 | Song | B23K 20/128 |
| 2024/0328373 A1 | 10/2024 | Song et al. | |
| 2024/0328374 A1 | 10/2024 | Song et al. | |

FOREIGN PATENT DOCUMENTS

| | | | | |
|---|---|---|---|---|
| AU | 2019234726 A1 | | 9/2019 | |
| AU | 2019290657 A1 | | 12/2019 | |
| AU | 2019338384 A1 | | 3/2020 | |
| AU | 2019383418 A1 | | 5/2020 | |
| AU | 2018359514 C1 | | 5/2021 | |
| CA | 2569350 A1 | * | 5/2007 | B23K 20/1245 |
| CA | 2569773 C | | 4/2013 | |
| CA | 3081330 A1 | | 10/2018 | |
| CA | 3093812 A1 | | 3/2019 | |
| CA | 3104289 A1 | | 6/2019 | |
| CA | 3112446 A1 | | 9/2019 | |
| CA | 3120796 A1 | | 11/2019 | |
| CN | 101629290 A | * | 1/2010 | B21J 5/063 |
| CN | 101537538 B | | 1/2011 | |
| CN | 101406987 B | | 3/2012 | |
| CN | 203843367 U | | 9/2014 | |
| CN | 104439686 A | | 3/2015 | |
| CN | 103639668 B | | 12/2015 | |
| CN | 105290608 A | | 2/2016 | |
| CN | 105750725 A | | 7/2016 | |
| CN | 103978304 B | | 9/2016 | |
| CN | 105965152 A | | 9/2016 | |
| CN | 106001905 A | | 10/2016 | |
| CN | 106735851 A | | 5/2017 | |
| CN | 107030371 A | | 8/2017 | |
| CN | 206366652 U | | 8/2017 | |
| CN | 107160030 A | * | 9/2017 | |
| CN | 107160109 A | | 9/2017 | |
| CN | 107498175 A | | 12/2017 | |
| CN | 206925453 U | | 1/2018 | |
| CN | 107813044 A | | 3/2018 | |
| CN | 107841744 A | | 3/2018 | |
| CN | 108372359 A | | 8/2018 | |
| CN | 108385101 A | | 8/2018 | |
| CN | 108838509 A | | 11/2018 | |
| CN | 109202271 A | * | 1/2019 | B23K 20/1215 |
| CN | 109202273 A | | 1/2019 | |
| CN | 109261940 A | * | 1/2019 | B22D 23/00 |
| CN | 107584122 B | | 2/2019 | |
| CN | 107116366 B | | 3/2019 | |
| CN | 110042385 A | | 7/2019 | |
| CN | 209272731 U | | 8/2019 | |
| CN | 110653618 A | | 1/2020 | |
| CN | 107900510 B | | 2/2020 | |
| CN | 109878084 B | | 6/2020 | |
| CN | 111331246 A | * | 6/2020 | |
| CN | 108971742 B | | 7/2020 | |
| CN | 109202273 B | | 9/2020 | |
| CN | 111655403 A | | 9/2020 | |
| CN | 211464825 U | | 9/2020 | |
| CN | 109202275 B | | 10/2020 | |
| CN | 111761198 A | | 10/2020 | |
| CN | 108603504 B | | 11/2020 | |
| CN | 109940163 B | | 12/2020 | |
| CN | 112108756 A | | 12/2020 | |
| CN | 108930034 B | | 1/2021 | |
| CN | 109202272 B | | 2/2021 | |
| CN | 109570934 B | | 2/2021 | |
| CN | 112355463 A | | 2/2021 | |
| CN | 112404453 A | | 2/2021 | |
| CN | 109967860 B | | 3/2021 | |
| CN | 112496522 A | | 3/2021 | |
| CN | 110640294 B | | 4/2021 | |
| CN | 112658460 A | | 4/2021 | |
| CN | 109570933 B | | 5/2021 | |
| CN | 112770884 A | | 5/2021 | |
| CN | 112828441 A | | 5/2021 | |
| CN | 110102871 B | | 6/2021 | |
| CN | 112958902 A | * | 6/2021 | B23K 20/122 |
| CN | 113001007 A | | 6/2021 | |
| CN | 113020625 A | | 6/2021 | |
| CN | 113172331 A | | 7/2021 | |
| CN | 111531266 B | | 8/2021 | |
| CN | 214212574 U | | 9/2021 | |
| CN | 111230282 B | | 10/2021 | |
| CN | 113523534 A | | 10/2021 | |
| CN | 113695573 A | | 11/2021 | |
| CN | 113695593 A | | 11/2021 | |
| CN | 113828907 A | | 12/2021 | |
| CN | 113857643 A | | 12/2021 | |
| CN | 214977765 U | | 12/2021 | |
| CN | 111055007 B | | 1/2022 | |
| CN | 215468782 U | | 1/2022 | |
| CN | 114131176 A | | 3/2022 | |
| CN | 217096135 U | | 3/2022 | |
| CN | 113172331 B | | 4/2022 | |
| CN | 114393292 A | | 4/2022 | |
| CN | 111575698 B | | 5/2022 | |
| CN | 111575699 B | | 5/2022 | |
| CN | 113146021 B | | 6/2022 | |
| CN | 114669858 A | | 6/2022 | |
| CN | 216780643 U | | 6/2022 | |
| CN | 111872543 B | | 7/2022 | |
| CN | 112025074 B | | 7/2022 | |
| CN | 113118612 B | | 7/2022 | |
| CN | 113351984 B | | 7/2022 | |
| CN | 114770784 A | | 7/2022 | |
| CN | 114799201 A | | 7/2022 | |
| CN | 114799480 A | | 7/2022 | |
| CN | 112407338 B | | 8/2022 | |
| CN | 113001005 B | | 8/2022 | |
| CN | 114833439 A | | 8/2022 | |
| CN | 114951954 A | | 8/2022 | |
| CN | 115055699 A | | 9/2022 | |
| CN | 115091022 A | | 9/2022 | |
| CN | 115156523 A | | 10/2022 | |
| CN | 115178855 A | | 10/2022 | |

(56) References Cited

FOREIGN PATENT DOCUMENTS

| | | | |
|---|---|---|---|
| CN | 115351514 A | 11/2022 | |
| CN | 217729675 U | 11/2022 | |
| CN | 115502543 A | 12/2022 | |
| CN | 115555700 A | 1/2023 | |
| CN | 115673528 A | 2/2023 | |
| CN | 115091025 B | 3/2023 | |
| CN | 115740727 A | 3/2023 | |
| CN | 218694877 U | 3/2023 | |
| CN | 113927151 B | 4/2023 | |
| CN | 114769922 B | 4/2023 | |
| CN | 218799795 U | 4/2023 | |
| CN | 218799797 U | 4/2023 | |
| CN | 218799801 U | 4/2023 | |
| CN | 116038093 A | 5/2023 | |
| CN | 116140783 A | 5/2023 | |
| CN | 116160108 A | 5/2023 | |
| CN | 115106641 B | 6/2023 | |
| CN | 115740726 B | 6/2023 | |
| CN | 116423033 A | 7/2023 | |
| CN | 116475558 A | 7/2023 | |
| CN | 219336363 U | 7/2023 | |
| CN | 219336364 U | 7/2023 | |
| CN | 219379326 U | 7/2023 | |
| CN | 116511543 A | 8/2023 | |
| CN | 116571769 A | 8/2023 | |
| CN | 116618816 A | 8/2023 | |
| CN | 115673526 B | 9/2023 | |
| CN | 116900465 A | 10/2023 | |
| CN | 116900467 A | 10/2023 | |
| CN | 116921840 A | 10/2023 | |
| CN | 116926531 A | 10/2023 | |
| CN | 220050404 U | 11/2023 | |
| CN | 117340415 A | 1/2024 | |
| CN | 117428313 A | 1/2024 | |
| CN | 220591878 U | 3/2024 | |
| CN | 117817098 A * | 4/2024 | |
| CN | 117943678 A | 4/2024 | |
| DE | 19948441 A1 | 4/2001 | |
| DE | 102014115535 B3 | 3/2016 | |
| DE | 102015216802 A1 | 3/2017 | |
| DE | 102016113289 A1 | 1/2018 | |
| DE | 102019106873 A1 | 9/2020 | |
| DE | 102019007902 A1 | 5/2021 | |
| EP | 1206995 A2 | 5/2002 | |
| EP | 1413384 A2 | 4/2004 | |
| EP | 3251768 A1 | 12/2017 | |
| EP | 3703888 A1 | 10/2018 | |
| EP | 4129552 A1 | 2/2023 | |
| FR | 3135002 A1 | 11/2023 | |
| GB | 2306366 A | 5/1997 | |
| GB | 2576260 B | 2/2020 | |
| GB | 2614889 A * | 7/2023 | ........... B23K 20/126 |
| IN | 2023/31035542 A | 9/2023 | |
| JP | H 1147960 A | 2/1999 | |
| JP | H 11156561 A | 6/1999 | |
| JP | 2000094159 A | 4/2000 | |
| JP | 20000334577 A | 12/2000 | |
| JP | 2003-322135 A | 11/2003 | |
| JP | 2004025296 A * | 1/2004 | ........... B23K 20/124 |
| JP | 3563003 B2 | 9/2004 | |
| JP | 2004261859 A | 9/2004 | |
| JP | 2004-311640 A | 11/2004 | |
| JP | 2005-171299 A | 6/2005 | |
| JP | 2007-061875 A | 3/2007 | |
| JP | 2009006396 A | 1/2009 | |
| JP | 2009-090295 A | 4/2009 | |
| JP | 4299266 B2 | 7/2009 | |
| JP | 2010-194557 A | 9/2010 | |
| JP | 5071144 B2 | 11/2012 | |
| JP | 5573973 B2 | 1/2013 | |
| JP | 6046954 B2 | 2/2013 | |
| JP | 2013166159 A | 8/2013 | |
| JP | 5326757 B2 | 10/2013 | |
| JP | 5864446 B2 | 2/2016 | |
| JP | 6201882 B2 | 9/2017 | |
| JP | 6365752 B2 | 8/2018 | |
| JP | 2020059039 A | 4/2020 | |
| JP | 6909034 B2 | 7/2021 | |
| JP | 2022-503795 A | 1/2022 | |
| JP | 7148491 B2 | 10/2022 | |
| KR | 10-0354387 B1 | 12/2002 | |
| KR | 20230134143 A * | 9/2009 | |
| KR | 20100113400 A | 10/2010 | |
| KR | 20110019270 A | 2/2011 | |
| KR | 20110088266 A | 8/2011 | |
| KR | 10-1194097 B1 | 10/2012 | |
| KR | 10-1230359 B1 | 2/2013 | |
| KR | 20160128939 A | 11/2016 | |
| KR | 20180044625 A | 5/2018 | |
| KR | 2021113973 | 9/2019 | |
| KR | 20210049085 A | 9/2019 | |
| KR | 10-2101364 B1 | 4/2020 | |
| KR | 20200087172 A | 7/2020 | |
| KR | 20210010980 A | 1/2021 | |
| KR | 10-2273514 B1 | 6/2021 | |
| KR | 20210130704 A | 10/2021 | |
| KR | 20230069412 A | 5/2023 | |
| KR | 10-2595360 B1 | 10/2023 | |
| TW | I688451 B | 3/2020 | |
| WO | WO 1998/051441 A1 | 11/1998 | |
| WO | WO 2000/020146 A1 | 4/2000 | |
| WO | WO 2009/127981 A2 | 10/2009 | |
| WO | WO 2009/142070 A1 | 11/2009 | |
| WO | WO 2011/017752 A1 | 2/2011 | |
| WO | WO 2012/065616 A1 | 5/2012 | |
| WO | WO 2012/141442 A2 | 10/2012 | |
| WO | WO 2013/076884 A1 | 5/2013 | |
| WO | WO 2014/057948 A1 | 4/2014 | |
| WO | WO 2014/178731 A2 | 11/2014 | |
| WO | WO 2016/072211 A1 | 5/2016 | |
| WO | WO 2016/106179 A1 | 6/2016 | |
| WO | WO-2016111279 A1 * | 7/2016 | ............. B23K 20/12 |
| WO | WO 2017075396 A1 | 5/2017 | |
| WO | WO 2019/089764 A1 | 5/2019 | |
| WO | WO 2019/099928 A2 | 5/2019 | |
| WO | WO 2019/115968 A1 | 6/2019 | |
| WO | WO 2019178138 A2 | 9/2019 | |
| WO | WO 2019178138 A3 | 9/2019 | |
| WO | WO 2019246251 A2 | 12/2019 | |
| WO | WO 2019246251 A3 | 12/2019 | |
| WO | WO 2019246251 A9 | 12/2019 | |
| WO | WO 2020/015228 A1 | 1/2020 | |
| WO | WO 2020055989 A1 | 3/2020 | |
| WO | WO 2020106952 A1 | 5/2020 | |
| WO | WO 2020/201299 A1 | 10/2020 | |
| WO | WO 2021/030693 A2 | 2/2021 | |
| WO | WO 2021/067978 A1 | 4/2021 | |
| WO | WO 2021/165545 A1 | 8/2021 | |
| WO | WO 2022032061 A1 | 2/2022 | |
| WO | WO 2022231423 A1 | 11/2022 | |
| WO | WO 2023/006180 A1 | 2/2023 | |
| WO | WO 2023087631 A1 | 5/2023 | |
| WO | WO 2023/099872 A1 | 6/2023 | |
| WO | WO 2024/078248 A1 | 4/2024 | |

OTHER PUBLICATIONS

Carter, RW et al. "Robotic Manufacturing of 18 ft. (5.5mm) Diameter Cryogenic Fuel Tank Dome Assemblies for the NASA Ares I Rocket", TWI 9th International Symposium on Friction Stir Welding 2012, May 15, 2012, 25 pages.

Rezaeinajad, SS et al., "Solid-State Additive Manufacturing of AA6060 Employing Friction Screw Extrusion", JOM 75: 4199-4211, Aug. 17, 2023, 13 pages.

Das, S. et al., "Selective Laser Sintering of High Performance High Temperature Materials", Laboratory for Freeform Fabrication, University of Texas at Austin, 1996, pp. 89-96.

Grätzel, M., "Advances in friction stir welding by separate control of shoulder and probe", Welding in the World (2021) 54:1931-1941.

Ohashi, T. et al., "Fastenerless-Riveting Utilizing Friction Stir Forming for Dissimilar Materials Joining", Key Engineering Materials, Aug. 2017, ISSN: 1662-9795, vol. 751, pp. 186-191, doi: 10.4028/www.scientific.net/KEM.751.186.

(56) References Cited

OTHER PUBLICATIONS

Miedzinski Mattias, "Materials for Additive Manufacturing by Direct Energy Deposition", Chalmers University of Technology Master's Thesis in Materials Engineering, 2017, http://publications.lib.chalmers.se/records/fulltext/253822/253822.pdf.

Mahmood. M, et al. "Metal Matrix Composites Synthesized by Laser-Melting Deposition: A Review" MDPI.com/journal/materials- Materials, 2020, vol. 13, 02593. https://www.mdpi.com/1996-1944/13/11/2593.

Davis, "Theoretical analysis of transpiration cooling of a liquid rocket thrust chamber wall", Jul. 2008, engineering, https://www.semanticscholar.org/paper/Theoretical-analysis-of-transpiration-cooling-of-a-Davis/730bfd8ae66b0bb026e7bf5cae6b73a14cbf74df.

Luo et al. Effects of Coolants of Double Layer Transpiration Cooling System in the Leading Edge of a Hypersonic Vehicle, Frontiers in Energy Research www.frontiersin.org, Sep. 9, 2021, vol. 9, Article 756820, https://www.frontiersin.org/articles/10.3389/fenrg.2021.756820/full.

Ohashi, T. et al., "Pseudo linear joining for dissimilar materials utilizing punching and Friction Stir Forming", Procedia Manufacturing, 2020, vol. 50, pp. 98-103.

Cold Spray Additive Manufactured Combustion Chamber, Impact Innovations GmbH, https://impact-innovations.com/en/applications/combustion-chamber/, 4 pages, Jun. 24, 2023.

Russell et al. "Performance Improvement of Friction Stir Welds by Better Surface Finish", George C. Marshall Space Flight Center Research and Technology Report 2014, 2 Pages, Jan. 1, 2015.

Saju, T. P. et al., "Joining dissimilar grade aluminum alloy sheets using multi-hole dieless friction stir riveting process", The International Journal of Advanced Manufacturing Technology, 2021, 112: 285-302.

Zhao et al. "Interfacial Bonding Features of Friction Stir Additive Manufactured Build for 2195-T8 Aluminum-Lithium Alloy" Journal of Manufacturing Processes 38, Jan. 2019, 15 pages.

Li et al, "Cold Spray+ as New Hybrid Additive Manufacturing Technology: A Literature Review" Science and Technology of Welding and Joining, 24(5), Apr. 15, 2019, pp. 420-445.

Khodabakhshi et al., "Surface Modification of a Cold Gas Dynamic Spray-deposited Titanium Coating on Aluminum Alloy by Using Friction-Stir Processing" Journal of Thermal Spray Technology, vol. 28, Aug. 2019, pp. 1185-1198.

Wang et al. "High Performance Bulk Pure Al Prepared Through Cold Spray-friction Stir Processing Compositive Additive Manufacturing" Journal of Materials Research and Technology, 9(4), Jun. 2020, pp. 9073-9079.

Hassan et al. "A Comprehensive Review of Friction Stir Additive Manufacturing (FSAM) of Non-Ferrous Alloys" Materials 16(7): 2723, Mar. 2023, 31 pages.

Zhao et al. "Influence of Tool Shape and Process on Formation and Defects of Friction Stir Additive Manufactured Build" Journal of Materials Engineering, vol. 47 Issue 9, Sep. 2019, pp. 84-92.

Davis, "Theoretical Analysis of Transpiration Cooling of a Liquid Rocket Thrust Chamber Wall", 2006, Theses—Embry-Riddle Aeronautical University, Daytona Beach, Florida, 103 pages.

\* cited by examiner

DEPOSITION HEAD FOR FRICTION STIR ADDITIVE MANUFACTURING DEVICES AND METHODS

BACKGROUND

Field

The technology relates generally to the joining of two or more parts using friction stir additive manufacturing.

Description of the Related Art

Friction stir additive manufacturing tools are used to manufacture or join parts. Typically, the weld profiles or surfaces formed by the tools can be inconstant, rough, and uncontrolled. It is therefore desirable to have improved tools for higher quality welds and surface finishes. Rivets can also be used to join parts and/or strengthen weld lines. The installation of rivets can create structural deformities in parts and as such it is desirable to have improved methods of forming rivets or rivet-like structures to improve the connection between parts.

SUMMARY

The embodiments disclosed herein each have several aspects no single one of which is solely responsible for the present disclosure's desirable attributes. Without limiting the scope of the present disclosure, its more prominent features will now be briefly discussed. After considering this discussion, and particularly after reading the section entitled "Detailed Description" one will understand how the features of the embodiments described herein provide advantages over existing approaches over existing methods of joining two or more parts using friction stir additive manufacturing.

In one aspect, a friction stir additive manufacturing device is provided. The device is configured to join a first work-piece and a second work-piece and includes a spindle and a deposition head. The spindle is configured to rotate about a central axis. The spindle includes a channel extending from a first end of the spindle to a second end of the spindle. The channel is configured to allow a filler material to pass through the spindle from the first end towards the second end. The spindle is further configured to deposit the filler material over a weld line as the device is advanced along an interface between the first work-piece and the second work-piece. The deposition head is configured to receive at least a portion of the second end of the spindle, and the deposition head is also configured to remain stationary relative to the rotating spindle. The deposition head includes a first semi-cylindrical portion having an inner radius and an outer radius relative to a first axis and a second semi-cylindrical portion having an inner radius and an outer radius relative to a second axis that is perpendicular to the first axis. The second semi-cylindrical portion has a chamfered inner surface configured to define a weld profile.

In some embodiments, the device includes a clearance between the deposition head and the spindle. In some embodiments, the clearance is between about 0.0005 inches and about 0.01 inches. In some embodiments, the first and second semi-cylindrical portions are integral. In some embodiments, the deposition head is removably coupled to the spindle. In some embodiments, the second end of the spindle is closer to the weld line than the inner surface of the second semi-cylindrical portion. In some embodiments, the first and second portions of the deposition head form an open space configured to receive the spindle. In some embodiments, a trailing surface of the first semi-cylindrical portion is coupled to a leading surface of the second semi-cylindrical portions. In some embodiments, the inner radius of the second semi-cylindrical portion varies. In some embodiments, the semi-cylindrical first portion has a surface configured to contact the weld line, the surface transitioning to the outer radius via a curved edge.

In another aspect, a deposition head for friction stir additive manufacturing includes a first semi-cylindrical portion and a second semi-cylindrical portion. The first semi-cylindrical portion includes a first end surface and a second end surface. The first end surface is configured to contact a first part and a second part. The first and second end surfaces are connected by an inner curved surface and an outer curved surface. The curved surfaces extend a length along a first axis and define a first side surface and a second side surface. The second semi-cylindrical portion includes a first end surface and a second end surface. The first and second end surfaces are connected by an inner curved surface and an outer curved surface. The curved surfaces extend a length along a second axis perpendicular to the first axis. The curved surfaces define a first side surface and a second side surface. The first side surface is configured to contact the first part and the second side surface is configured to contact the second part. The first semi-cylindrical portion and the second semi-cylindrical portion are further configured to define an open space to receive a rotating spindle to deposit a filler material to join the first part and the second part. The inner curved surface of the second semi-cylindrical portion is configured to define a weld profile along a weld line.

In some embodiments, the first and second side surfaces of the first semi-cylindrical portion contact the first end surface of the second semi-cylindrical portion. In some embodiments, the first end surface of the first semi-cylindrical portion transitions to the outer curved surface via a curved edge. In some embodiments, the second semi-cylindrical portion forms a channel that extends along the second axis and is enclosed by the inner curved surface and surfaces of the first and second parts. In some embodiments, the channel has an open end defined by the second end surface and is configured to allow the filler material to exit the deposition head. In some embodiments, the first portion defines half of a diameter of the open space and the second portion defines half of the diameter of the open space. The open space extends along the first axis.

In another aspect, a method of joining parts is provided. The method includes advancing a friction stir additive manufacturing device along a weld line between a first work-piece and a second work-piece. The friction stir additive manufacturing device includes a deposition head positioned around a spindle comprising a channel configured to feed a filler material. The method also includes rotating the spindle about the channel while advancing the device along the weld line; depositing the filler material along the weld line; shaping the filler material into a defined weld profile using a curved surface of the deposition head; and joining the first work-piece and the second work-piece together.

In some embodiments, the first work-piece includes a first material and the second work-piece includes a second material, the second material being different than the first material. In some embodiments, the filler material is the same as one of the first material and the second material. In some embodiments, the filler material is a combination of the first material and the second material. In some embodiments, the filler material is different than both the first material and the second material. In some embodiments, the method includes positioning a mold below the first work-piece and the second work-piece opposite the friction stir additive manufacturing device, and filling the mold with the filler material while joining the first work-piece and the second work-piece, wherein the filler material in the mold forms an integrated stiffener. In some embodiments, at least one of the first work-piece and the second work-piece include a plurality of through holes extending along an axis generally parallel to and offset a distance from the weld line, wherein the filler material extends into the plurality of holes to form rivets.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure. The drawings as depicted are not necessarily drawn to scale. The relative dimensions and proportions as shown are not intended to limit the present disclosure.

DETAILED DESCRIPTION

Figure 1:
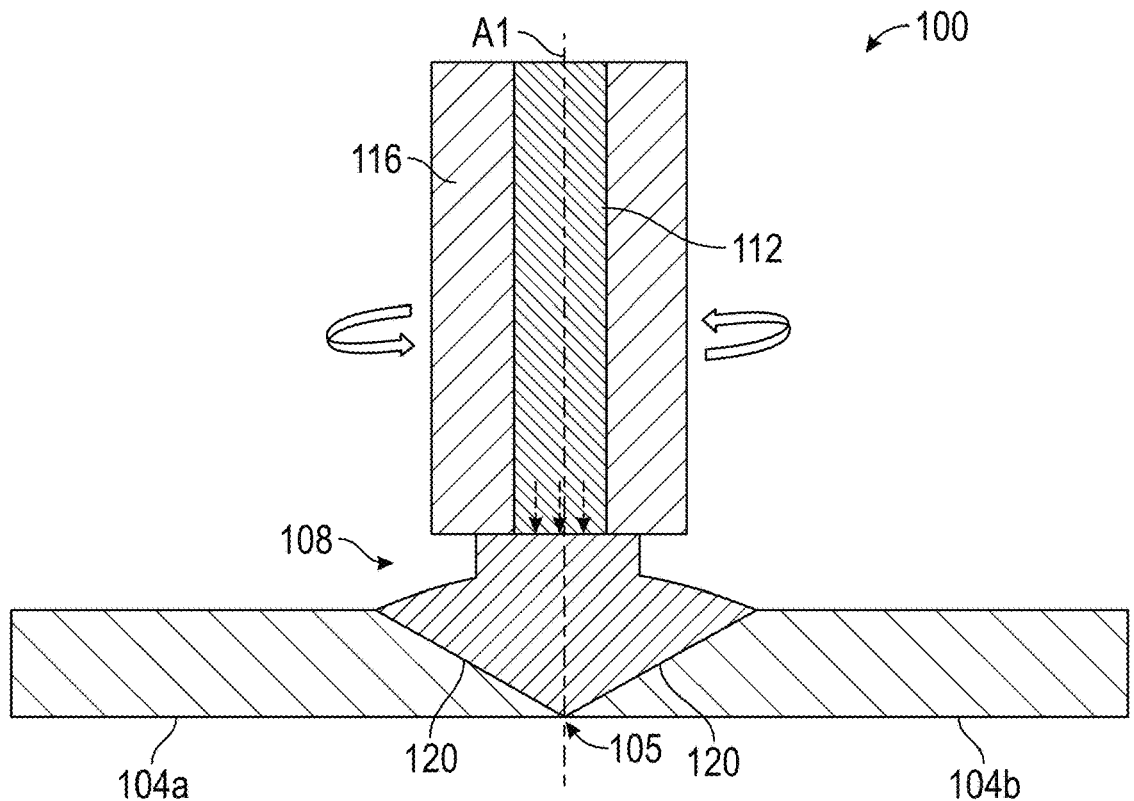
FIGS. 1-2 are cross-sectional views of example embodiments of a friction stir additive manufacturing device and welded butt joint according to an embodiment of the present disclosure.

Embodiments of the present disclosure relate to devices and methods for joining parts or work-pieces using friction stir additive manufacturing techniques. Friction stir additive manufacturing devices of the present disclosure can include a deposition head having surfaces that mold and shape filler material as it is exiting a spindle of the device. The surfaces of the deposition head can define the final shape of a weld profile that join two parts, resulting in high quality weld lines when joining or forming the parts. Significantly improved weld quality and consistency can result in lower manufacturing costs, reduction in defects that can cause failures, and production of high performing large metallic structures, such as but not limited to propellent tanks and orbital habitats. Friction stir additive manufacturing devices and methods of the present disclosure can also include formation of integrated stiffeners during the process of joining two parts. Advantageously, material utilization and reduced material cost can be significantly improved. Manufacturing cost and lead time can also be reduced. In addition, friction stir additive manufacturing devices and methods of the present disclosure can form in-situ rivets in a first part using the same filler material that is used to join the first part to a second part, at the same time the parts are joined together. In-situ rivets according to embodiments of the present disclosure can be formed concurrent with the process of joining the two parts together, eliminating or substantially reducing the need to add each individual rivet of a plurality of rivets in a manual or automated post-joining finishing process. In-situ rivets according to embodiments of the present disclosure can also strengthen a joint between two parts, particularly parts of dissimilar materials. Throughout this disclosure, example systems, devices, and methods will be described with reference to joining substantially planar parts and work-pieces, but it will be understood that the present disclosure can be implemented to join parts and work-pieces having many different shapes.

The following detailed description is directed to certain specific embodiments of the present disclosure. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the present disclosure may include several novel features, no single one of which is solely responsible for its desirable attributes or which is essential to practicing the present disclosure.

Embodiments of the present disclosure relate generally to the use of friction stir additive manufacturing (FSAM) to join two or more parts or components. Friction stir additive manufacturing devices and methods can use a tool with a high speed rotation sleeve or spindle that generates heat to soften a filler material or feed stick material. Under a high pressure applied by the rotating spindle the softened material will flow out from the spindle and can be deposited on a part or a component, for example a substrate or a work-piece. The tool can be moved repeatedly over the same area to apply additional layers of materials. Alternatively, the part that the material is applied to can be moved relative to the tool. This can be used to form a part and/or to join multiple parts. Various features may be incorporated to strengthen the weld lines formed between parts using FSAM. For example, in-situ rivets may be formed by filling preformed holes positioned along or near an edge of one or both parts with filler material when forming the weld line between parts. In some non-limiting examples, the filler material can expand away from the weld line to reach and fill the preformed holes.

The devices and methods described herein can also include deposition heads that can result in high quality weld lines when joining or forming parts. Traditional friction stir additive manufacturing tools can generate an unacceptable amount of excess material along a weld line, which in turn can lead to inconsistent weld quality. The friction stir additive manufacturing devices having deposition heads according to embodiments of the present disclosure can produce a clean weld line leading to superior weld quality and consistency.

Embodiments of the devices and methods described herein can also be used to form integrated parts, such as stiffeners. The stiffeners can be formed along a joint while simultaneously joining two parts. The formation of integrated parts, such as stiffeners, can reduce costs and shorten lead times for manufacturing. For example, the manufacturing time can be reduced as stiffeners can be molded directly along the joint while the joint is being formed. The manufacturing time can be reduced by the filler material filling both a stiffener mold and a joint between two parts during the same process. The cost of raw material can also be reduced as thinner skin sheets can be used and the material utilization rate is higher as compared to traditional methods. The use of a mold to form the integrated parts can allow for more flexibility in size and shape of the integrated parts.

The use of FSAM to join multiple parts can offer a valuable alternative to other welding techniques. For example, the use of friction stir additive manufacturing can allow one to join parts of the same and/or dissimilar materials. The use of friction stir additive manufacturing can also minimize the impact on the material properties of the parts as they are being joined or welded.

The filler material can be the same or different than the material of the parts to be joined. The filler material can be a mixture of materials. For example, different materials for both the filler material and the parts can include aluminum, titanium, stainless steel, and Inconel. Parts of different types of materials, using filler material of one or more materials, can be welded together to achieve a high structural performance with a low manufacturing cost. The filler material can be a combination of the materials of each part being joined. The filler material can be the same as one of the parts to be joined. The filler material can be the same as all parts to be joined.

The use of FSAM to join together same or dissimilar parts offers many advantages. FSAM can lower manufacturing costs. For example, FSAM joining can improve material utilization by joining parts together in a way that reduces or eliminates the need for machining and milling processes. FSAM can also improve manufacturability. For example, FSAM is a solid state joining technology that can eliminate many of the heat-related defects and distortion that causes manufacturability issues. FSAM can also make it possible to join components of many different types of material together effectively that would not be possible to join using standard welding methods. FSAM can also improve mechanical performance. For example, because of the reduced heat-related material degradation and defects, the joint formed maintains a better structural performance compared to traditional welding techniques.

Figure 2:
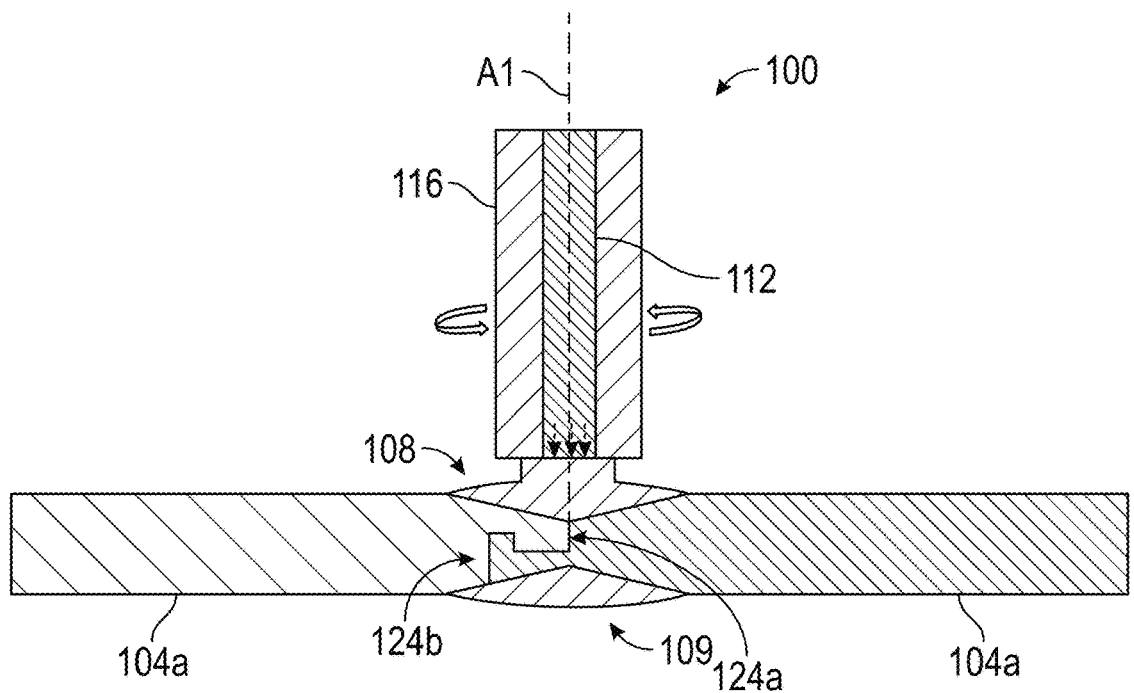

Various example embodiments of devices and methods according to the present disclosure will now be described with respect to the figures. FIGS. 1 and 2 are cross-sectional views of a friction stir additive manufacturing device 100 being used to join two parts 104*a*. 104*b* using a butt joint. In this non-limiting example, the parts 104*a*, 104*b* are substrates, but it will be understood that many other types of parts can be joined. The friction stir additive manufacturing device 100 can be used to deposit a filler material to a deposition zone 108. The deposition zone 108 can include the area where the filler material exits the friction stir additive manufacturing device 100 and/or the area where the filler material contacts the parts 104*a*, 104*b*. The deposition zone 108 can move as the friction stir additive manufacturing device 100 is moved across the parts 104*a*, 104*b*. In other terms, the deposition zone 108 can be the area between the friction stir additive manufacturing device 100 and the parts 104*a*, 104*b* and include the area where the filler material is deposited. The filler material can flow through a channel 112 of a spindle 116. The spindle 116 can be configured to rotate about a central axis A1 extending through the center of the spindle 116. The rotation of the spindle 116 can generate heat to soften the filler material, which can allow the filler material to flow through the channel 112 and to the deposition zone 108.

The spindle 116 can be configured to move across surfaces of the parts 104a, 104b. In one example, the spindle 116 moves in a transverse direction relative to the parts 104a, 104b. For example, the direction of movement of the spindle 116 relative to the page can be in and out of the page. Alternatively, the parts can be moved and the spindle 116 can remain stationary. While being moved across the surface of the parts 104a, 104b, the filler material can continue to be deposited to the deposition zone 108. The deposition zone 108 can extend along the location where the parts 104 meet. The movement of the spindle 116 and the deposition of the filler material can form a weld line that joins the parts 104a, 104b. With reference to the orientation of FIGS. 1 and 2, the weld lines are formed in a direction that is perpendicular to the plane of the page. The spindle 116 can be moved along the weld line one or more times to deposit a predetermined number of layers of filler material.

With reference to FIG. 1, the parts 104a, 104b can be formed of or include the same material and/or have similar material properties. In some embodiments of the present disclosure, as shown in FIG. 1, the parts 104a, 104b being joined are positioned directly next to each other such that an edge of the first part 104a is in direct contact with an edge of the second part 104b. In other embodiments of the present disclosure, for example embodiments described below with reference to FIGS. 4, 14A, 14B, 15A, and 15B, the parts being joined are positioned a predetermined distance from each other such that there is a gap between an edge of the first part and an edge of the second part. In the non-limiting example illustrated in FIG. 1, the parts 104a. 104b are positioned adjacent to each other such that they are in direct contact at a point 105. The parts 104a, 104b can have angled or chamfered edges 120 forming an area where the filler material can be deposited. Embodiments of devices and methods according to the present disclosure can also advantageously augment and/or strengthen scarf joints.

With reference to FIG. 2, the parts 104a, 104b can include different materials and/or have different material properties. The parts 104a, 104b can have interlocking features 124a, 124b. The first part 104a can have a first interlocking feature 124a configured to interact with a second interlocking feature 124b of the second part 104b. The interlocking features 124a, 124b can strengthen the joining of the parts 104a, 104b by forming an initial joint. The initial joint formed by the interlocking features 124a, 124b can then be strengthened by a joint formed using the friction stir additive manufacturing device 100. As shown in FIG. 2, parts can be joined by forming more than one weld line 109. Once filler material is deposited to a deposition zone 108, the filler material can solidify forming the weld line 109. As such, a weld line 109 is formed in an area that was previously a deposition zone 108, while a deposition zone 108 is an area where filler material is currently being deposited. For example, the weld line 109 of FIG. 2 has transitioned from a deposition zone 108 to a weld line 109 as filler material is no longer being deposited. Filler material was initially deposited to the weld line 109 and then the parts 104a, 104b were rotated 180 degrees to apply filler material to the deposition zone 108 labeled in FIG. 2. The labeled deposition zone 108 is an area where filler material is depicted as being added. As such, the filler material of weld line 109 has solidified forming the weld line 109. The deposition zone 108 will also eventually transition to a weld line once the filler material deposition is complete. Once the deposition zone 108 has transitioned to a weld line 109 (e.g., filler material deposition is complete), weld lines 109 are now formed on two opposing surfaces of the parts 104a. 104b. Embodiments of devices and methods according to the present disclosure can advantageously join parts using initial joints and/or multiple weld lines as shown in FIG. 2. Embodiments of devices and methods according to the present disclosure can also advantageously augment and/or strengthen preexisting joints, including but not limited to the joint having interlocking features illustrated in FIG. 2.

FIGS. 3, 4, 5A and 5B illustrate additional non-limiting examples where friction stir additive manufacturing can be used to join two parts. Any of the devices and methods according to embodiments of the present disclosure can be used to join together parts similar to those described with reference to FIGS. 3, 4, 5A and 5B.

Figure 3:
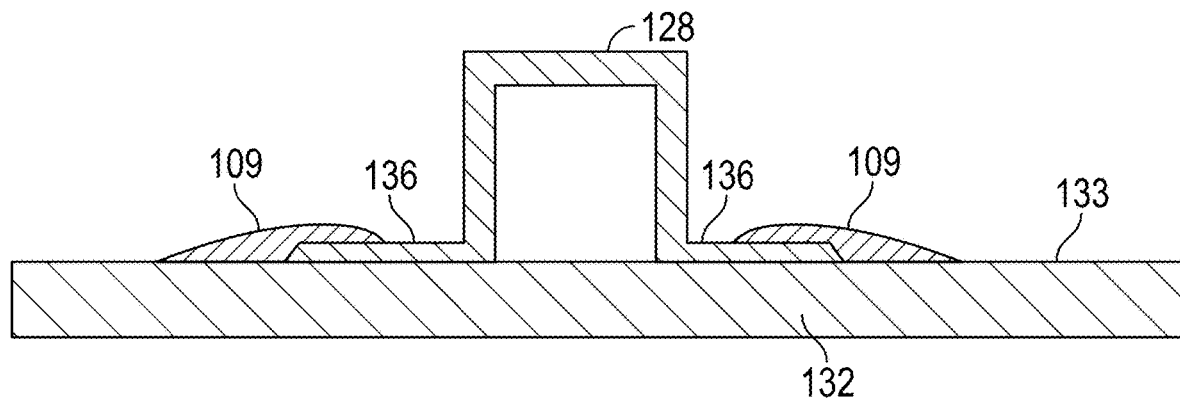
FIG. 3 is a cross-sectional view of a stiffener that has been joined to a part using friction stir additive manufacturing devices and methods according to the present disclosure.

FIG. 3 is a cross-sectional view of a box or closed stiffener 128 that has been joined to a single part 132 using friction stir additive manufacturing according to embodiments of the present disclosure. The stiffener 128 can have flanges 136 that can be joined to a surface 133, for example a major surface, of the part 132. Various types of stiffeners can be joined to one or more parts. For example, flat stiffeners, angled stiffeners, tee-shaped stiffeners, box or closed stiffeners, stiffeners with bulbs, riveted angled stiffeners, single-sided stiffeners, double-sided stiffeners, and multi-leg stiffeners can be joined to one or more parts using devices and methods according to embodiments of the present disclosure. The friction stir additive manufacturing device 100 can be used to deposit the filler material at the deposition zones to form the weld lines 109 to join the flanges 136 of the stiffener 128 to the surface of the part 132. Weld lines 109 correspond to deposition zones where filler material was previously deposited in accordance with devices and methods of the present disclosure. The deposition zones of this embodiment are areas overlapping the flanges 136 and the major surface of the part 132. The stiffener 128 having a height extending above the major surface of the part 132 can present space constraints due to the height and width of the friction stir additive manufacturing device 100. Further, the flanges 136 being positioned in a different horizontal plane than the major surface of the part 132 can impact the orientation of the friction stir additive manufacturing device 100 when depositing filler material as the device may need to be angled to contact both the major surface of the part 132 and the flanges 136. Advantageously, embodiments of the devices and methods of the present disclosure can join a stiffener and a substrate as illustrated in this non-limiting embodiment.

Figure 4:
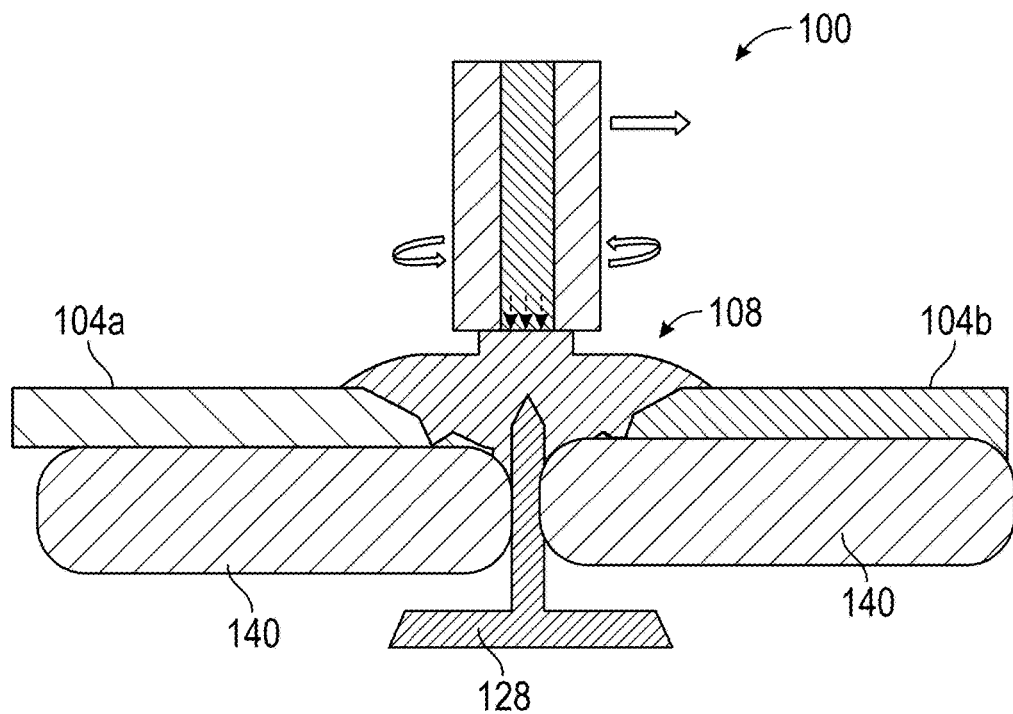
FIG. 4 is a cross-sectional view of two parts and a stiffener being joined together using friction stir additive manufacturing devices and methods according to the present disclosure.

FIG. 4 is a cross-sectional view of two parts 104a, 104b and a stiffener 128 being joined together using friction stir additive manufacturing in accordance with devices and methods of the present disclosure. Any of the friction stir additive manufacturing devices and methods described herein, for example but not limited to a friction stir additive manufacturing device 100 with a deposition head according to the present disclosure, can be used to join the two parts 104a, 104b and the stiffener 128. The parts 104a, 104b can be positioned above substrates 140. In the non-limiting example illustrated in FIG. 4, the parts 104a, 104b are in direct contact with a top surface of the substrates 140. The substrates 140 can be used to support the parts 104a. 104b during the friction stir additive manufacturing process. For example, the substrates 140 can help prevent or reduce movement of the parts 104a, 104b as filler material is deposited. The stiffener 128 can be positioned between the substrates 140 and between the parts 104a, 104b. The substrates 140 can be positioned such that they apply a pressure or force against the stiffener 128 to retain the positioning of the stiffener 128 as the filler material is deposited. The filler material can then be deposited to the deposition zone 108 using any process or method described herein to form a weld line. The filler material can solidify to join the parts 104a, 104b and the stiffener 128 together. In some embodiments, the surfaces of the parts 104a, 104b at the deposition zone can have irregular or jagged edges. The irregular or jagged edges can increase the strength of the weld that is formed as the material can flow into the cavities formed by the irregular or jagged edges reducing the formation of voids or flaws.

Figure 5A:
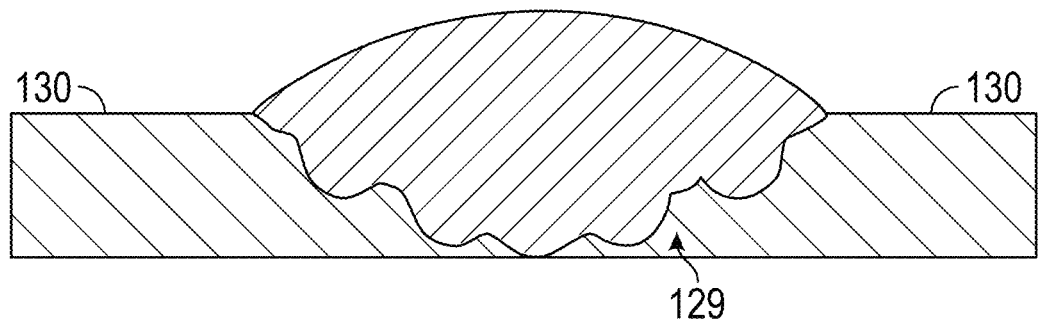
FIGS. 5A and 5B are cross-sectional views of example mechanical locking properties that can be formed when joining parts or creating joint interfaces using friction stir additive manufacturing devices and methods according to the present disclosure.
Figure 5B:
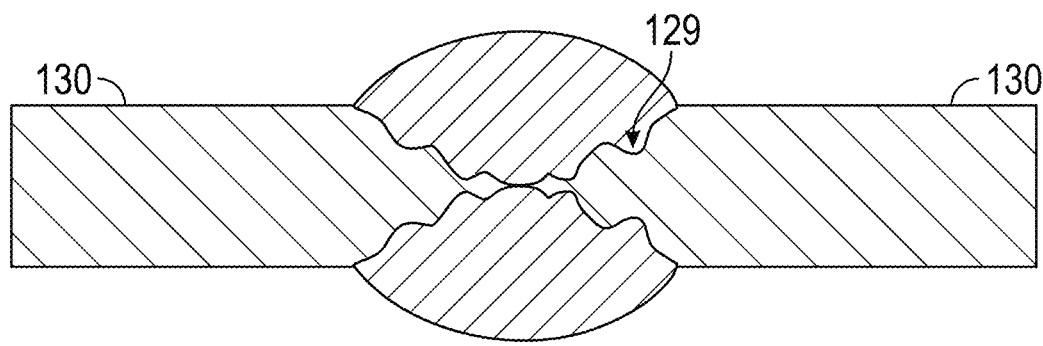
Figure 6:
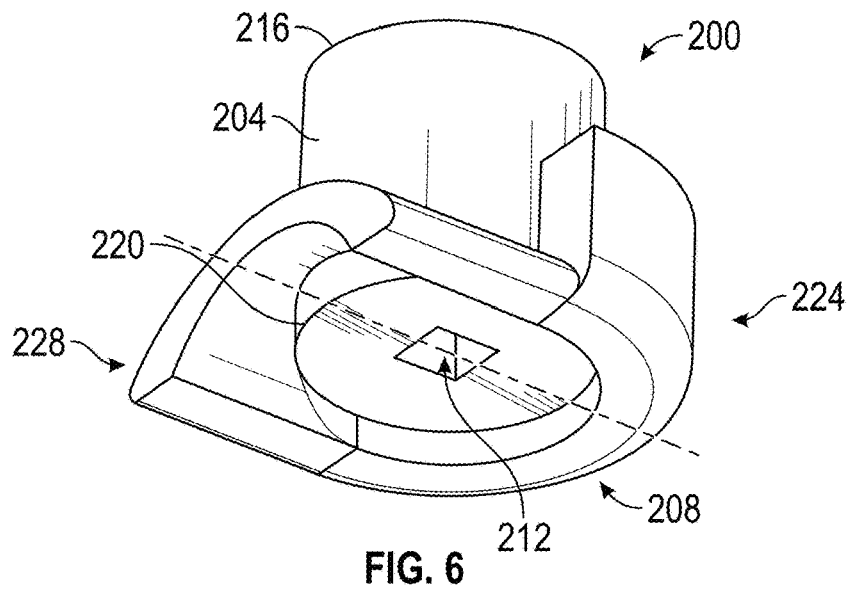
FIG. 6 is a perspective view of an example embodiment of a friction stir additive manufacturing device having a deposition head according to the present disclosure.
Figure 7:
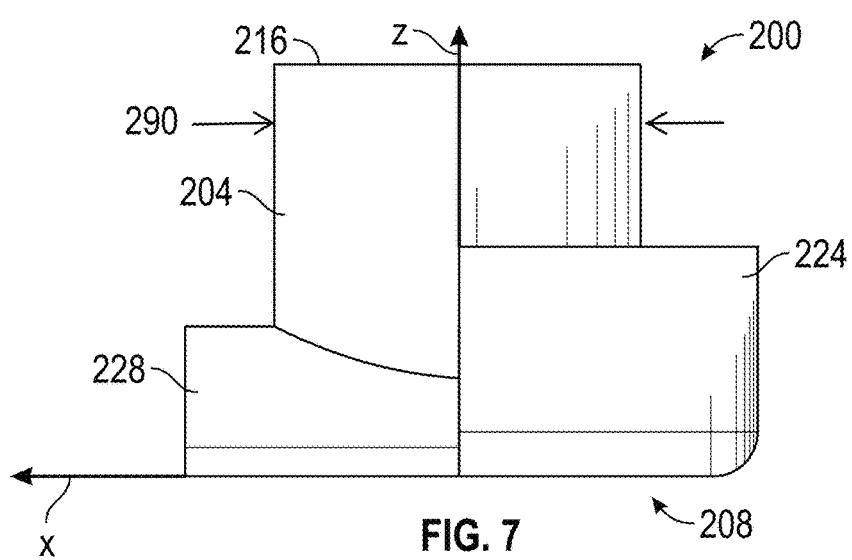
FIG. 7 is a side view of the friction stir additive manufacturing device of FIG. 6.
Figure 8:
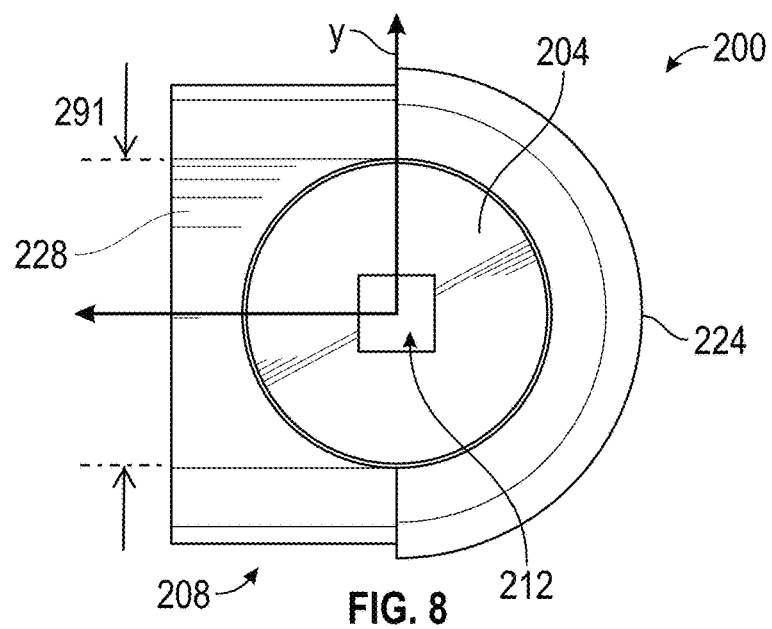
FIG. 8 is a top view of the friction stir additive manufacturing device of FIG. 6.

FIGS. 5A and 5B illustrate cross-sectional views of example mechanical locking properties 129 that can be formed when joining parts 130 or creating joint interfaces using FSAM in accordance with devices and methods of the present disclosure. Any of the friction stir additive manufacturing devices and methods described herein, for example but not limited to a friction stir additive manufacturing device 100 with a deposition head according to the present disclosure, can be used to join two parts 130 or create joint interfaces as illustrated in FIGS. 5A and 5B. The locking properties 129 can be configured to strengthen the joints being formed. For example, the locking properties 129 can have scallop features. The scallop features can be used to increase the joint contact surface areas. The scallop features can also act as a mechanical lock to improve the joint capability. Features such as the scallop properties can be incorporated when using FSAM to create a joint interface in a part 130 as shown in FIG. 5A, or join parts 130 as shown in FIG. 5B. These examples are intended to be illustrative and non-limiting.

Devices and methods of the present disclosure for joining parts and creating joint interfaces, such as those illustrated in the non-limiting examples of FIGS. 5A-5B, can address limitations in traditional joining technologies. Such limitations can include issues with weldability and compatibility of the materials being joined, oxidation and material degradation in heat affected zones, residual thermal stresses, and distortions and cracks. As described above, devices and methods according to embodiments of the present disclosure can advantageously join parts of same or dissimilar materials in ways that are not feasible or viable using other welding technologies, while minimizing the impact on material properties of the joined parts. For example, devices and methods according to embodiments of the present disclosure can be used to create complex, contour-shaped panels and highly efficient propellant tanks that performs better at elevated temperature.

Devices and methods according to the present disclosure can also be useful in joining large structures (for example, propellant tank panels) in ambient environments, without introducing defects and degradation in the base materials. Additionally, devices and methods of the present disclosure can minimize heat distortion and be useful in integrating stiffening structural components into a large structure, without affecting the material properties of the base parts, for example as shown in FIGS. 1-5B.

Figure 9:
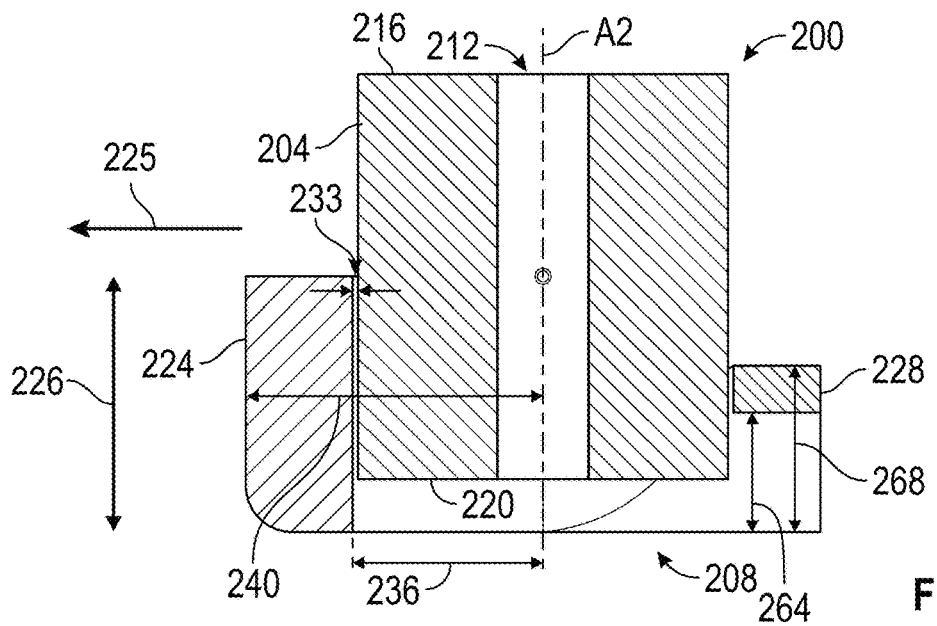
FIG. 9 is a cross-sectional view of the friction stir additive manufacturing device of FIG. 6.

Friction Stir Additive Manufacturing Devices and Methods Using a Deposition Head According to Embodiments of the Present Disclosure FIGS. 6-9 illustrate an example embodiment of a friction stir additive manufacturing device 200 using a deposition head according to the present disclosure. FIG. 9 is a cross section taken along the dashed line shown in FIG. 6. The friction stir additive manufacturing devices 200 can be used to join two parts or work-pieces. The friction stir additive manufacturing device 200 can include a spindle 204 and a deposition head 208. The spindle 204 and the deposition head 208 can be removably assembled. The spindle 204 can be configured to rotate about a central axis A2 (as best shown in FIG. 9) and the deposition head 208 can be configured to remain stationary relative to the spindle 204.

The spindle 204 can include a channel 212. The channel 212 can extend between a first end 216 and a second end 220 of the spindle 204. The channel 212 can have any shaped cross-section, for example circular, square, rectangular, or polygonal. The channel 212 can be centrally located in the spindle 204. The channel 204 can extend along the central axis A2 of the spindle 204. The channel 212 can be configured to allow a filler material to pass through the channel 212 to a deposition zone.

Figure 10:
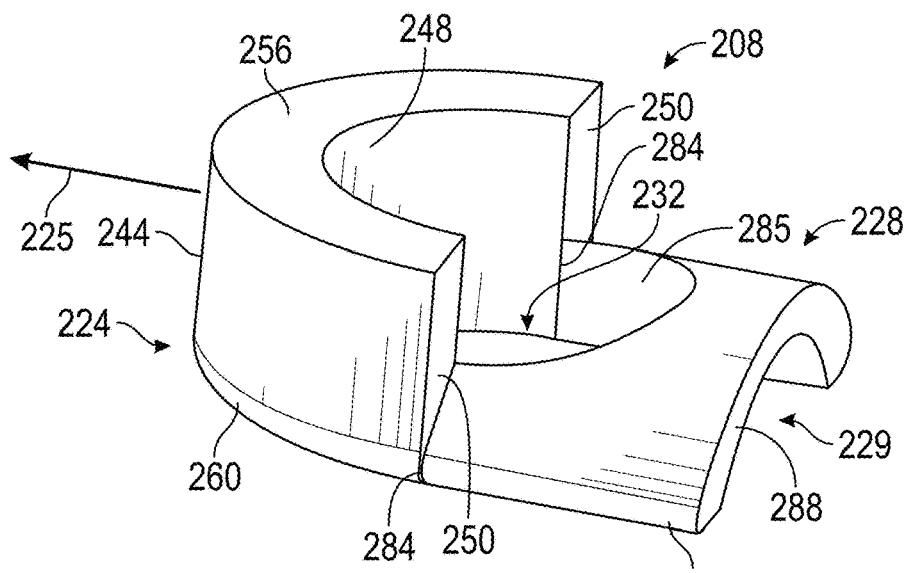
FIGS. 10 and 11 are perspective views of the deposition head of FIG. 6.
Figure 11:
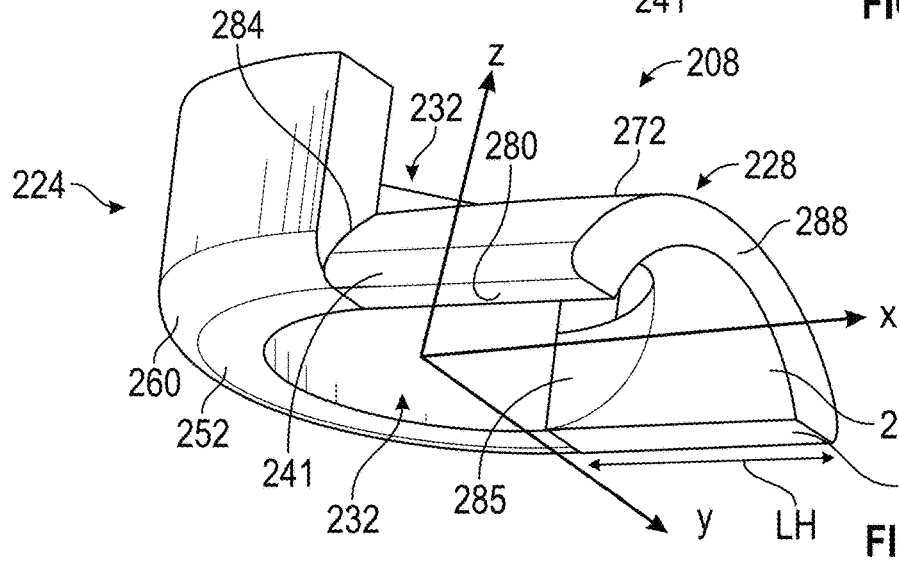

FIGS. 10-11 show the deposition head 208 with the spindle 204 removed to show features of the deposition head 208 in more detail. The deposition head 208 can be configured to form a pre-defined weld profile. For example, the deposition head 208 can include surfaces configured to mold and shape filler material as it is exiting the spindle 204. The surfaces of the deposition head 208 can define the final shape of the weld profile. The deposition head 208 can control the deposition of the filler material in that the surfaces limit the movement of the filler material by providing boundaries that determine the weld profile. The weld profile is pre-defined in that the configuration of the surfaces of the deposition head 208 are configured to form a consistent, reproducible and/or controlled weld profile. For example, the weld profile can include a convex surface, a rounded surface, a curved surface, a smooth surface, or a domed shape. The weld profile can include a smooth or regular surface and/or shape and not an irregular pattern.

The deposition head 208 can include a first portion 224 and a second portion 228. The first portion 224 can be separate from the second portion 228. The first portion 224 and the second portion 228 can be a single integral or unitary part. The first portion 224 can have a height extending in the direction of the Z-axis that is greater than a height of the second portion 228 extending in the direction of the Z-axis. The first portion 224 and the second portion 228 can form an open space 232 configured to receive and/or retain the spindle 204. When the spindle 204 is received within the open space 232 there can be a predetermined clearance 233 between deposition head 208 and the spindle 204. In one non-limiting embodiment, the clearance is about 0.005 inches, about 0.006 inches, about 0.007 inches, about 0.009 inches, about 0.010 inches, or any value in between these values. It will be understood that other clearances can be suitably implemented in embodiments of the present disclosure. The clearance can be sized to minimize any filler material from traveling through the clearance. In some instances, the exterior diameter 290 of the spindle 116 (illustrated in FIG. 7) can be between about 0.5 inches to about 2 inches, for example, about 0.5 inches, about 0.75 inches, about 1 inch, about 1.25 inches, about 1.5 inches, about 1.75 inches, about 2 inches, or any value in between. The exterior diameter 290 of the spindle 116 can be slightly less than the width 291 of the second portion 228 measured along the y-axis (illustrated in FIG. 8). For example, the exterior diameter 290 of the spindle 116 can be about 90 to 95% of the width 291 of the second portion 228. In one non-limiting embodiment, the exterior diameter 290 is about 1 inch and the width 291 of the second portion is 1.1 inch. It will be understood that these examples are illustrative and other dimensions can be suitably implemented.

The first portion 224 can be semi-cylindrical in shape. For example, in some instances, the first portion 224 can be generally C-shaped. In some instances, the first portion 224 can have an arch shape. The first portion 224 can have an inner radius 236 and an outer radius 240 (as best shown in FIG. 9) relative to a first axis (for example, the Z-axis as best shown in FIG. 11). The outer radius 240 can define at least a portion of an outer curved surface 244 of the first portion 224. The outer curved surface 244 (as best shown in FIG. 10) can be referred to as the leading surface of the first portion 224 as it is the frontmost portion of the deposition head 208 as it moves relative to a work-piece or work-pieces. For example, the leading surface is the first portion to travel over the weld line as the device moves in a tool advance direction 225.

As best shown in FIG. 10, the inner radius 236 can define at least a portion of an inner curved surface 248 and at least a portion of the open space 232 formed by the first portion 224 and the second portion 228. In some instances, the inner radius 236 can define approximately half of a diameter of the open space 232. The outer and inner curved surfaces 244, 248 can extend a length 226 (as best shown in FIG. 9) vertically along the z-axis. The length 226 can extend at least partially adjacent the spindle 204 in the direction of the z-axis. As best shown in FIG. 10, the part 224 can define in part first and second side surfaces 250 that connect the outer and inner curved surfaces 244, 248. The side surfaces 250 can be referred to as the trailing surfaces of the first portion 224 as they trail behind the leading surface of outer curved surface 244 as the deposition head 208 moves along a weld line in the tool advance direction 225.

The first portion 224 can have a first end surface 252 (as best shown in FIG. 11) and a second end surface 256 (as best shown in FIG. 10). The first end surface 252 can be configured to contact the surfaces of parts or work-pieces. The second end surface 256 can be opposite the first end surface 252 and face away from the surfaces of parts or work-pieces. The inner curved surface 248 and the outer curved surface 244 can be connected by the first end surface 252 and the second end surface 256.

The first end surface 252 of the first portion 224 can transition to the outer curved surface 244 via a curved edge 260, as best shown in FIG. 11. The curved edge 260 can have a predetermined radius of curvature. The curved edge 260 can have a radius of curvature from about 0.1 inches to about 0.5 inches, for example, about 0.1 inches, about 0.2 inches, about 0.3 inches, about 0.4 inches, about 0.5 inches or any value in between. The curved edge 260 can be configured to minimize fretting on the surface of the parts being joined. For example, the curved edge 260 can reduce the wear and tear of the surfaces of the parts being joined when the friction stir additive manufacturing device is moved across the surfaces. The curved edge 260 allows for a smoother tool surface contacting the surfaces of the parts, thus reducing fretting or wear and tear when the tool travels forward on the substrate surface.

As best shown in FIGS. 10 and 11, the second portion 228 can be semi-cylindrical in shape. For example, in some instances the second portion 228 can be generally C-shaped and/or a compressed or flattened C-shape. In some instances, the second portion 228 can have an arch shape. A concave surface of the second portion 228 can face downward toward the work-piece(s) to define an area at least partially enclosed by surfaces of the work-piece(s) and the concave surface of the second portion 228. At least partially enclosed area can be filled, or at least partially filled, with softened filler material as the friction stir additive manufacturing device 200 is advanced. The filler material is shaped to form a final weld line by the second portion 228. The shape and dimensions of the second portion 228 can be adjusted to optimize the shape and dimensions of the formed weld line. The second portion 228 can have an inner radius 264 and an outer radius 268 relative to a second axis (for example, the X-axis), as best shown in FIG. 9. The outer radius 268 can define at least a portion of an outer curved surface 272 of the second portion 228. The inner radius 264 can define at least a portion of an inner curved surface 276 of the second portion 228. The outer curved surface 272 can face away from a part or work-piece and the inner curved surface 276 can face toward a part or work-piece. As best shown in FIG. 11, the outer curved surface 272 and the inner curved surface 276 can extend a length LH horizontally along the X-axis. The length can define in part first and second side surfaces 280 that connect the outer and inner curved surfaces 272, 276. The side surfaces 280 can be configured to contact the surfaces of parts or work-pieces.

The second portion 228 can have a first end surface 284 and a second end surface 288. At least a portion of the first end surface 284 of the second portion 228 can be configured to contact the second side surface 250 of the first portion 224. In some embodiments, the first end surface 284 of the second portion 228 can be coupled to the second side surface 250 of the first portion 224. The first end surface 284 can be referred to as a leading surface of the second portion 228 as it moves across the weld line prior to the remaining portion of the second portion 228. The first end surface 284 can have two contact areas to contact two respective side surfaces 250 of the first portion 224. The surface 285 can define at least a portion of the open space 232 formed by the first portion 224 and the second portion 228. The second end surface 288 can be opposite the first end surface 284 and face away from the second side surface 250 of the first portion 224. The second end surface 288 can be referred to as the trailing surface as it trails behind the leading surface when the deposition head 208 is moved along a weld line.

As best shown in FIG. 11, the inner curved surface 276 can define a weld profile. The inner curved surface 276 can be a concave surface. The inner curved surface 276 can be rounded. In some instances, the inner curved surface 276 of the second portion 228 can be chamfered. For example, the inner curved surface 276 of the second portion 228 can have a symmetrical sloping edge. In some instances, the inner curved surface 276 can be formed by a plurality of curved portions. The inner curved surface 276 can define a tapered clean edge along the weld line. The inner curved surface 276 can be configured to mold, shape, and/or form the filler material as it is deposited over the weld line. For example, predetermined features of the inner curved surface 276 (for example, the size and shape of the inner curved surface 276) can determine the mold, shape and/or form that the filler material takes as it is being deposited. For example, in embodiments having a chamfered surface the chamfered surface determines the shape of the edges and the top surface of the weld line. The mold, shape, and/or form is controlled by the inner curved surface 276 and is consistent between welds. The inner curved surface 276 can be configured as a mold and the solidified weld profile can be configured as a cast. It will be understood that embodiments of the present disclosure are not limited to a deposition head having an inner surface 276 that is curved, and non-curved inner surfaces 276 can be suitably implemented to form weld profiles having non-curved shapes. Example weld profiles will be discussed in more detail below with reference to FIG. 13.

The second portion 228 can optionally have chamfered edges 241. The chamfered edges 241 can extend parallel to the X-axis, as best shown in FIG. 11. The second portion 228 has an open end configured to allow the filler material to exit the deposition head 208. The open end can be formed by an interior channel or space 229, as best shown in FIG. 10. The interior channel 229 can be at least partially defined by the inner curved surface 276 and extend in the direction of the X-axis as shown.

Figure 13:
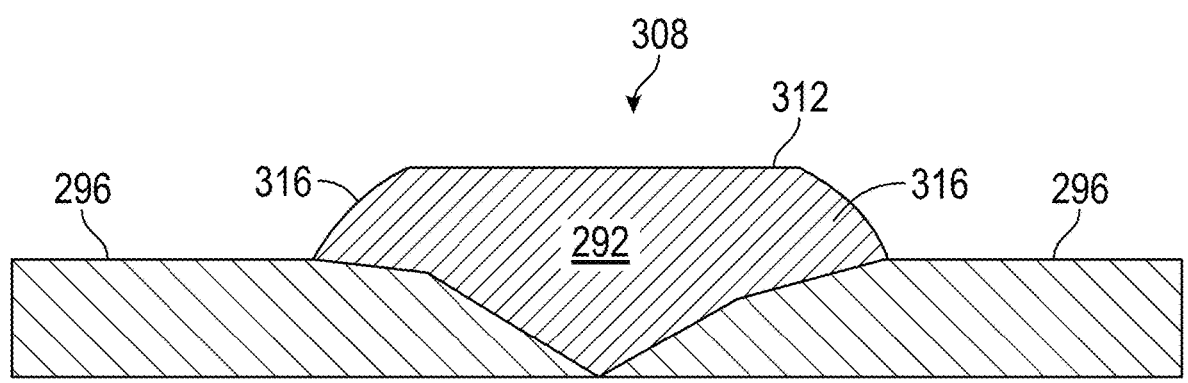
FIG. 13 is a cross-sectional view of a weld profile formed by the friction stir additive manufacturing device of FIG. 6.
Figure 13A:
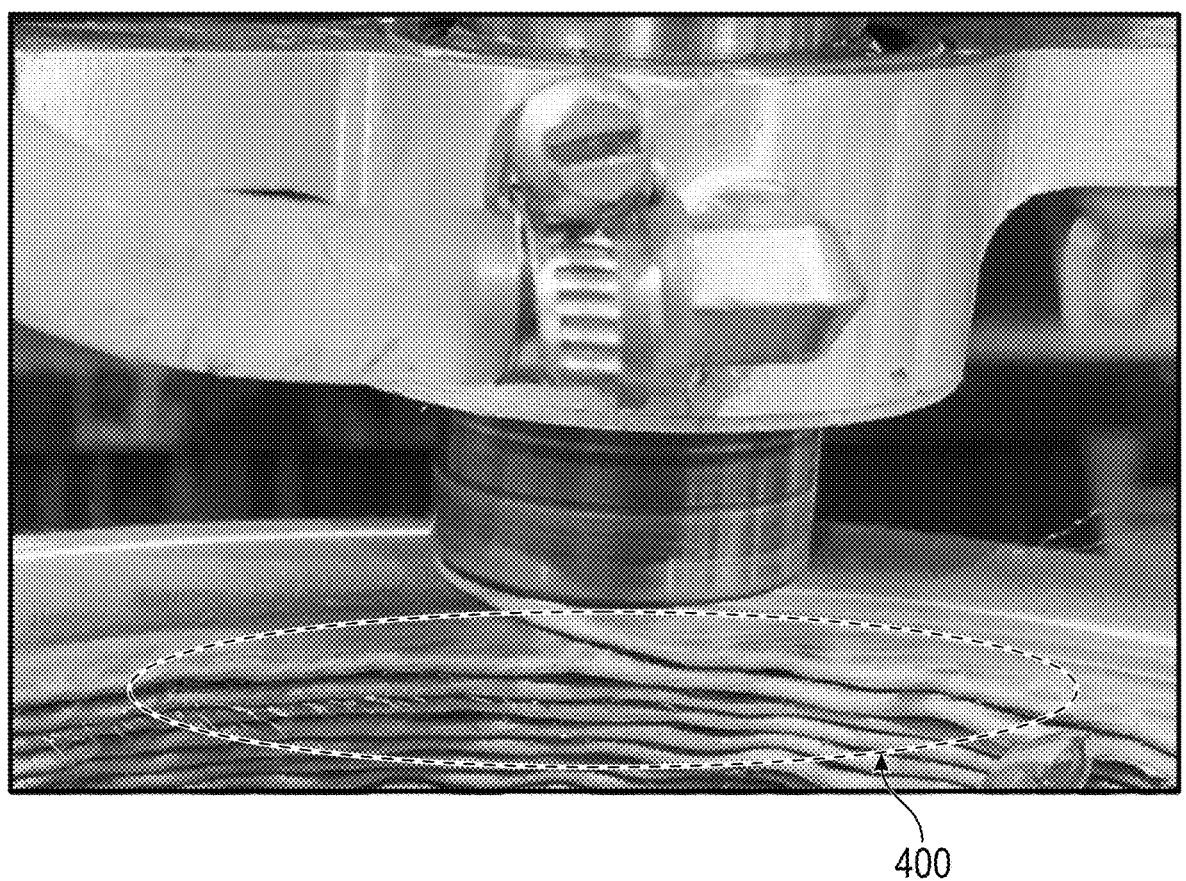
FIGS. 13A-13E illustrate defects associated with traditional friction stir additive manufacturing tools.
Figure 13B:
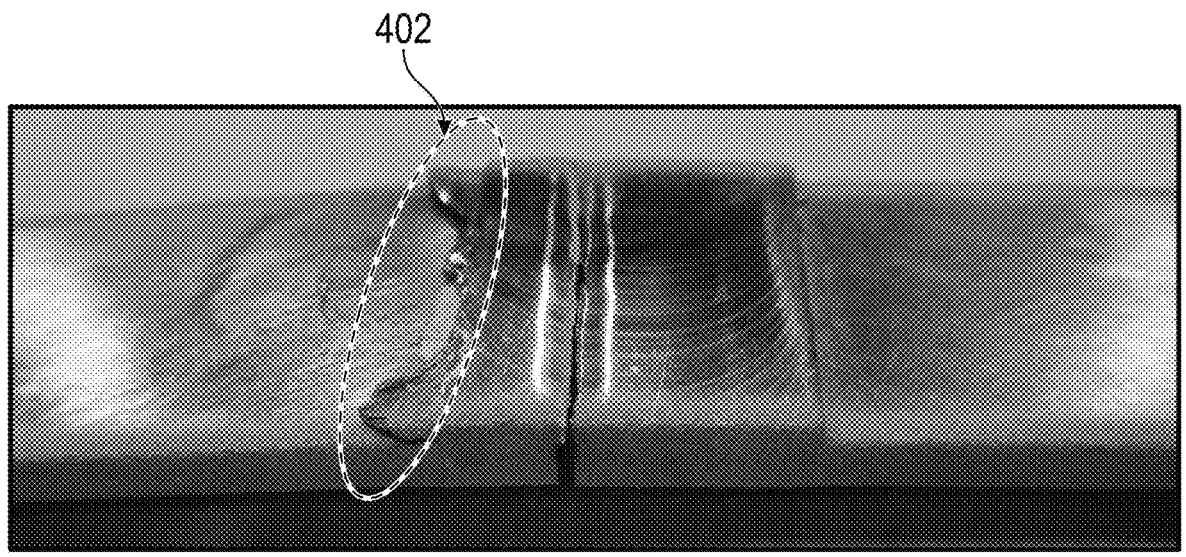
Figure 13C:
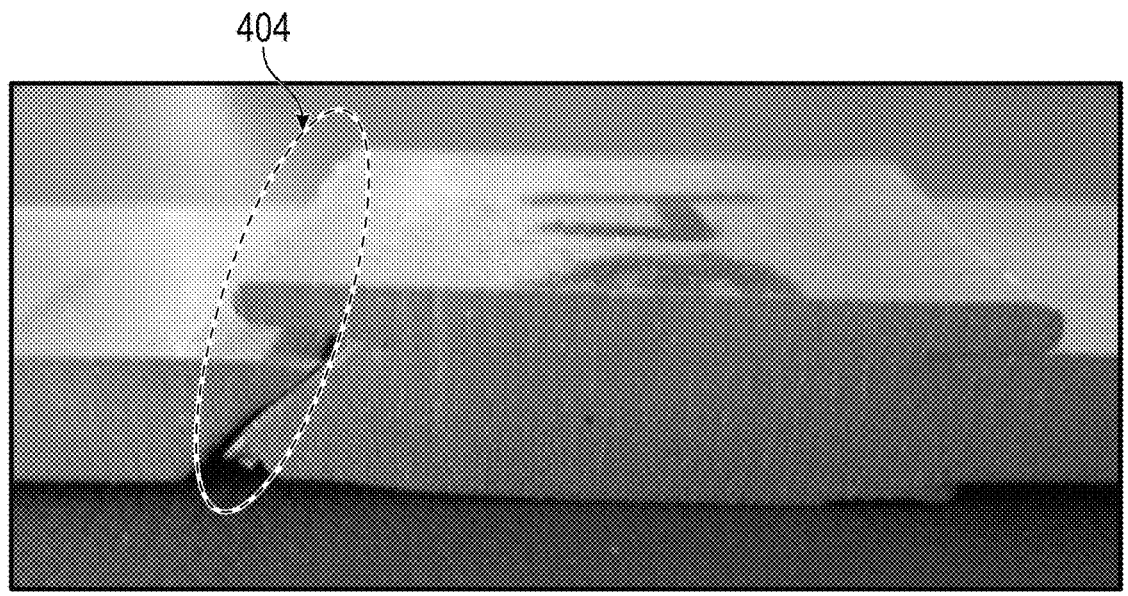
Figure 13D:
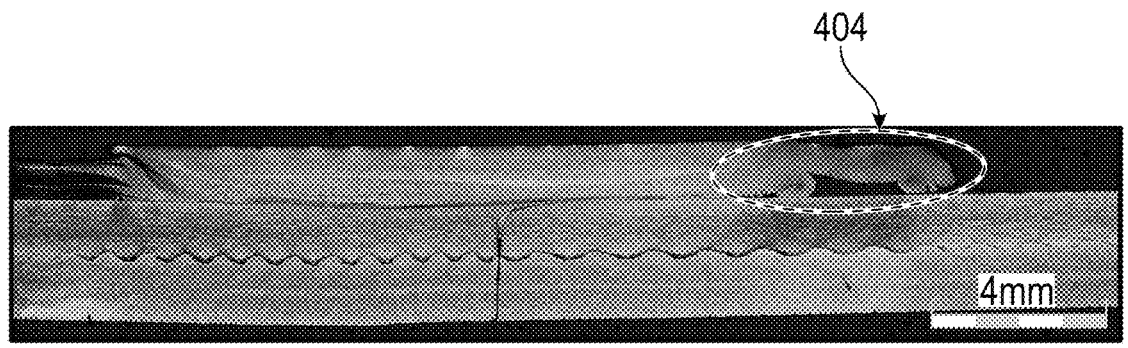
Figure 13E:
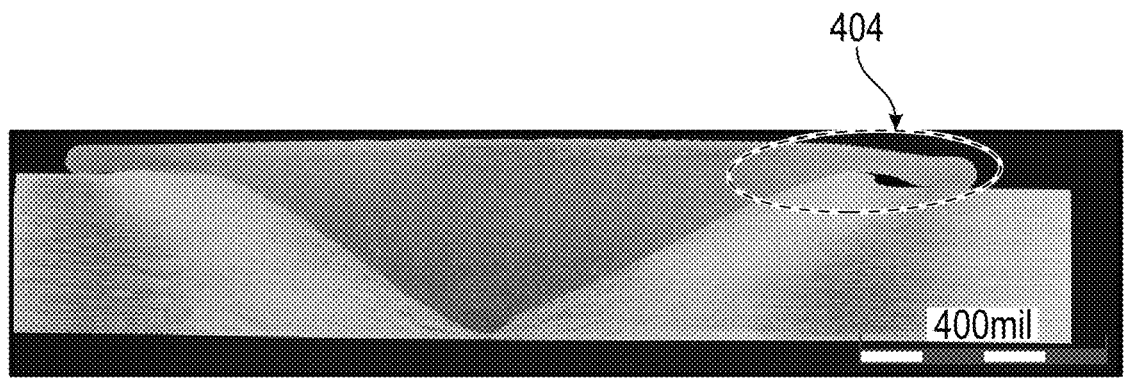

Embodiments of the deposition head 208 according to the present disclosure can provide many benefits and advantages. For example, the deposition head 208 provides a higher quality weld, as shown in FIG. 13. In traditional friction stir additive manufacturing tools, there is excessive filler material that can squeeze out 400 along the edges of weld lines, as shown in FIG. 13A. The excessive filler material causing squeeze out 400 can cause defects such as rough edges 402 (see FIG. 13B) and un-bonded over hanging materials 404 (see FIGS. 13C-E). Defects such as these can cause premature failures of the welded joints. The deposition heads 208 described herein can eliminate these defects by forming controlled, high quality welds with smooth pre-defined weld profiles and clean edges. Additionally, the deposition head 208 can produce consistent predictable weld profiles. Consistent weld profiles and quality can case the process qualification and enables more efficient designs. Further, the deposition head 208 can minimize filler material waste and eliminate any post processing after the joining or welding of parts.

Figure 12:
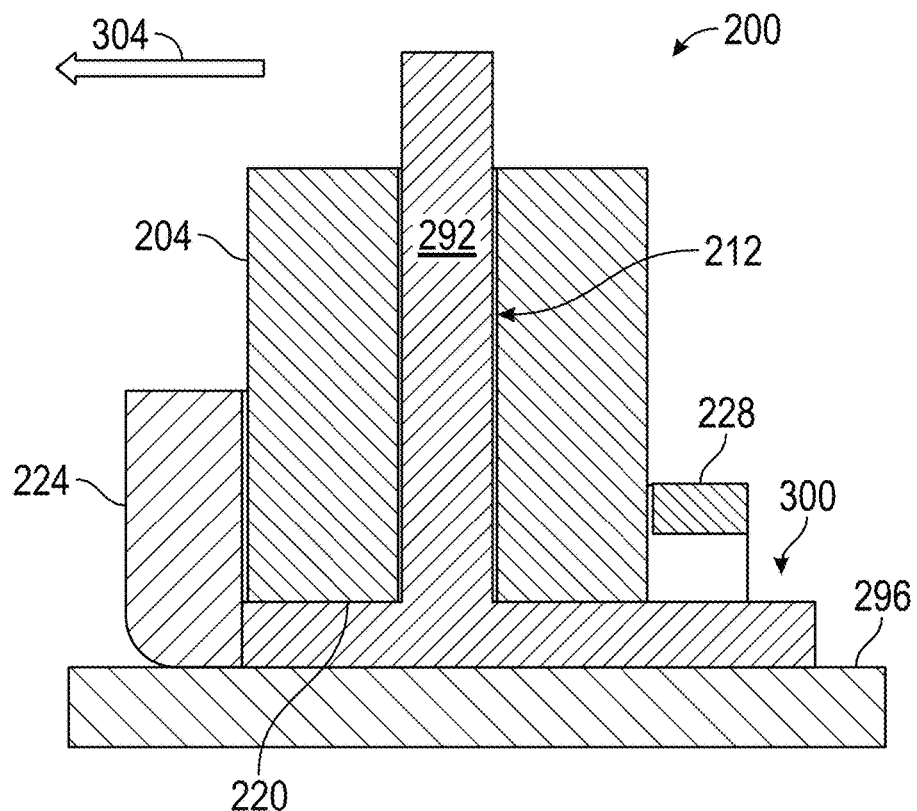
FIG. 12 is a cross-sectional view of the friction stir additive manufacturing device of FIG. 6 depositing a material.

FIG. 12 is a side cross-sectional view of the friction stir additive manufacturing device 200 depositing a filler material 292 to a deposition zone 300 on a surface of a part 296. The cross-sectional view is taken between two parts 296, as such only one part 296 is visible in FIG. 12. The second part is visible in FIG. 13. The deposition zone 300 can be located along an interface between the parts 296. FIG. 12 depicts part of a deposition zone 300 while the remaining portion of the deposition zone is not shown. The interface can be the area where filler material is deposited. In some embodiments, the interface can be formed between the parts 296, for example as shown in FIG. 13. In some embodiments, the interface can be an area where the parts 296 are in direct contact. In some embodiments, the parts 296 to be joined are not in direct contact and are separated by a distance. In such embodiments, the interface can be an area that spans the distance separating the parts 296. In some embodiments, the interface can be an area where a joint can be formed between the parts 296. In some embodiments, the interface can be an area that can be filled with material that joins the parts 296. In some embodiments, the interface can be an area that at least partially overlaps with edges of each part 296 and either the contact zone of the parts 296 and/or a space separating the parts 296.

While one part 296 is visible in FIG. 12, the friction stir additive manufacturing device 200 is being used to join two parts 296. The second part 296 is not visible in FIG. 12 but is visible in FIG. 13. The friction stir additive manufacturing device 200 is being advanced in the direction of arrow 304 (see FIG. 12). While the friction stir additive manufacturing device 200 is being advanced, the spindle 204 is rotating about the channel 212. The rotation of the spindle 204 heats the filler material 292, allowing it to flow through the channel and to the deposition zone 300. The deposition zone 300 can define a weld line. The deposition head 208 defines a weld profile 308 (see FIG. 13) of the weld line while advancing across the parts 296 and depositing the filler material 292. The filler material 292 exits the channel 212 and then at least some portions of the inner curved surface 276 of the second portion 228 define the weld profile 308. At least some portions of the second end 220 of the spindle 204 can define the weld profile 308.

FIG. 13 is a front cross-sectional view of the weld profile 308 formed by the friction stir additive manufacturing device 200. The weld profile 308 has been formed to join parts 296. As shown, the filler material 292 has solidified and joined the parts at a contact location. The weld profile 308 can have a flat, planar, or smooth surface 312 with curved edges 316. As described above, the shape of at least some portions of the weld profile 308, such as the curved edges 316 of the weld profile 308 in the non-limiting embodiment of FIGS. 12 and 13, can be determined by the deposition head 208, in particular the inner surface 276 of the second portion 228. In some embodiments described in detail below with reference to FIG. 14A-14C, the shape of all portions of the weld profile 308 is determined by a deposition head according to the present disclosure (a portion of the weld profile 308 is not determined by a lower end of a spindle). In such embodiments, the weld profile 308 can be curved, for example, as shown in FIG. 14C. The devices and methods described herein provide the benefit of producing weld profiles that are controlled and consistent. In contrast, traditional weld profiles can be unpredictable irregularly-patterned welds.

With reference to FIGS. 12 and 13, the second end 220 of the spindle 204 can also define the weld profile 308. The second end 220 can contact the filler material 292 as it exits the spindle 204, thus defining a top surface of the weld profile 308. For example, the second end 220 can create the flat upper surface of the weld profile 308. Additionally, the distance between the second end 220 of the spindle 204 and the surface 296 of the part can determine the height of the weld profile 308.

Advantageously, the distance between the second end 220 of the spindle 204 and the surface 296 of the part can be adjusted in embodiments of the present disclosure. In some embodiments, the distance can be between about 0.02 inches to about 0.1 inches, for example, about 0.02 inches, about 0.04 inches, about 0.06 inches, about 0.08 inches, about 0.1 inches, or any value in between. In one non-limiting embodiment in which the filler material includes aluminum alloy, the distance between the second end 220 of the spindle 204 and the surface 296 of the part is between about 0.02 inches and about 0.1 inches. In another non-limiting embodiment in which the filler material includes steel, titanium, or other hard alloy, the distance between the second end 220 of the spindle 204 and the surface 296 of the part is less than about 0.06 inches.

Integrated Stiffeners According to the Embodiments of the Present Disclosure

Figure 14A:
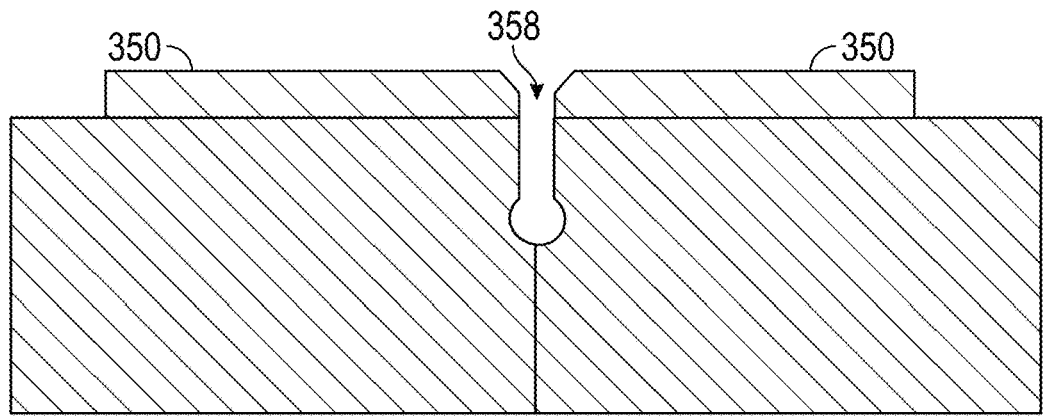
FIG. 14A is a cross-sectional view of two parts positioned on a mold for forming an integrated stiffener using friction stir additive manufacturing devices and methods according to the present disclosure.
Figure 14B:
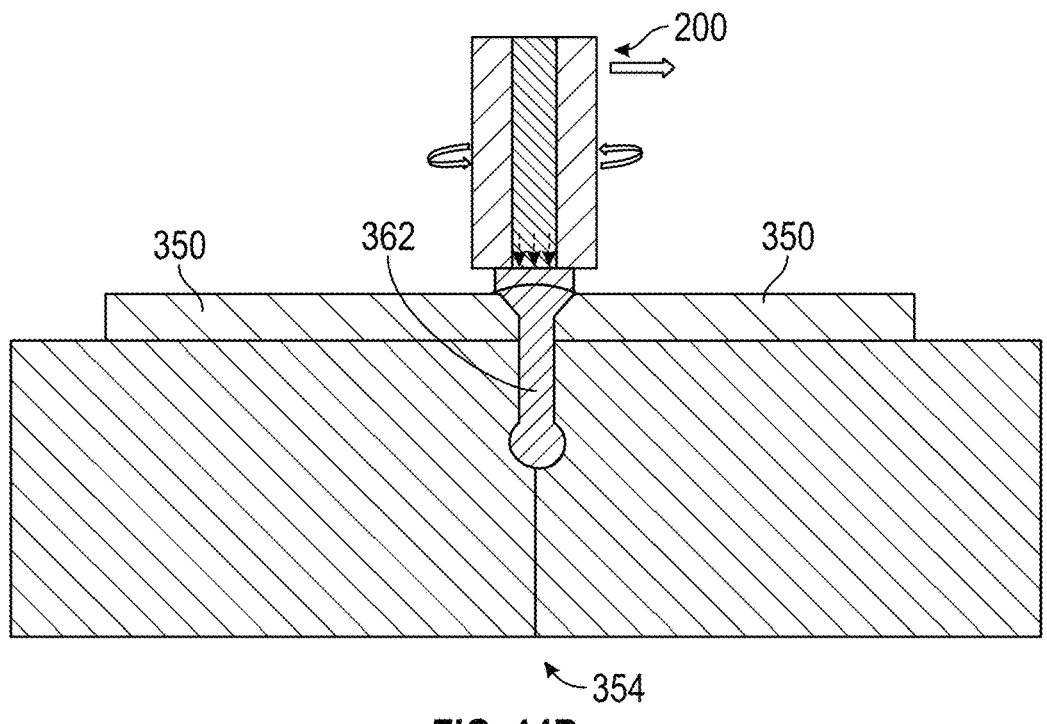
FIG. 14B is a cross-sectional view of an integrated stiffener being formed while joining two parts using friction stir additive manufacturing devices and methods according to the present disclosure.
Figure 14C:
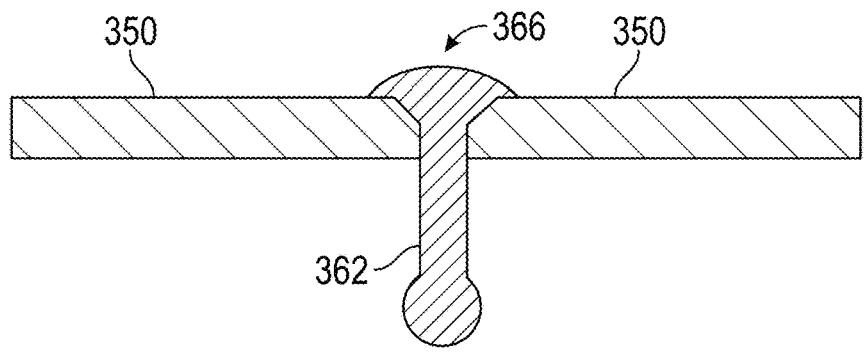
FIG. 14C is a cross-sectional view of two parts joined together with an integrated stiffener using friction stir additive manufacturing devices and methods according to the present disclosure.

FIGS. 14A and 14B are cross-sectional views of two parts 350 positioned on a mold 354 to be joined together using any of the devices and methods of the present disclosure. The mold 354 can be formed by a single portion or by one or more portions. The mold 354 can define a cavity 358 sized and shaped to form a stiffener 362 that is integrated with the parts 350 as the parts 350 are being joined together. The mold 354 and the cavity 358 can be sized and shaped to form various types of stiffeners, including but not limited to flat stiffeners, angled stiffeners, tee-shaped stiffeners, box or closed stiffeners, stiffeners with bulbs, riveted angled stiffeners, single-sided stiffeners, double-sided stiffeners, and multi-leg stiffeners. Accordingly, the stiffener 362 can be formed at the same time or substantially the same time that the stiffener is integrated with the parts 350.

The parts 350 can be positioned and secured to the mold 354. The parts 350 can be positioned such that the joint to be formed is positioned above the cavity 358. The parts 350 can be separated a predetermined distance to account for the width of the cavity 358. The distance the parts 350 are separated can be the same as (substantially equal to) or different than the width of the cavity 358. FSAM using devices and methods of the present disclosure can then be used to join the parts 350. For example, the friction stir additive manufacturing device 200 can be used to join together parts 350 using any method described herein. As the parts 350 are being joined, the stiffener 362 can simultaneously be formed. As the additive manufacturing device 200 is translated across the parts 350 to form a weld line, the filler material can also extend into the cavity 358 filling the cavity. The filler material can solidify within the cavity 358 to form the stiffener 362. The filler material can also solidify at the location between the parts 350 thus forming the weld line or joint. The weld line joining the parts 350 and the stiffener 362 can be integral.

FIG. 14C is a cross-sectional view of the stiffener 362 and the parts 350 joined together. The mold 354 has been removed. As described above, the filler material has solidified to join together the parts 350 and form the integrated stiffener 362. The stiffener 362 can have a bulb or rounded surface 366. For example, the friction stir additive manufacturing device 200 with the deposition head 208 illustrated in FIGS. 6-12 can be used to form the bulb or rounded surface 366. The bulb or rounded surface 366 can provide improved structural efficiency. The use of devices and methods according to the present disclosure to form stiffeners 362 can allow for multiple stiffeners to easily be formed in various orientations and integrated into large structures.

Integrated stiffeners, such as the stiffener 362, can provide many benefits and advantages. For example, the formation of the stiffeners as described herein can improve material utilization and reduce material cost. Manufacturing cost and lead time can also be reduced. The integrated stiffeners can form more efficient stiffener profiles, such as the bulb or rounded surface 366. The devices and methods according to embodiments of the present disclosure can advantageously allow for the use of more efficient materials, such as high modulus metal matrix composite materials. The devices and methods according to embodiments of the present disclosure can allow for the joining of dissimilar materials while simultaneously forming the stiffeners. Joint quality can also be improved by using high strength materials.

Friction Stir Additive Manufacturing Devices and Methods Forming In-Situ Rivets According to the Embodiments of the Present Disclosure FIGS. 15A-15D illustrate a friction stir additive manufacturing device and method for forming in-situ rivets while joining together two parts or work-pieces according to embodiments of the present disclosure. In-situ rivets can strengthen an FSAM joint between two parts and can be formed concurrent with the process of joining the two parts together, eliminating or substantially reducing the need to add each individual rivet of a plurality of rivets in a manual or automated post-joining finishing process. Manufacturing costs, production time, defects, and errors associated with manual or automated systems for forming rivets can be reduced significantly using devices and methods of the present disclosure. The use of friction stir additive manufacturing to form in-situ rivets also reduces the risk of damage to the final part by eliminating the need to manually form rivets in the part.

Figure 15A:
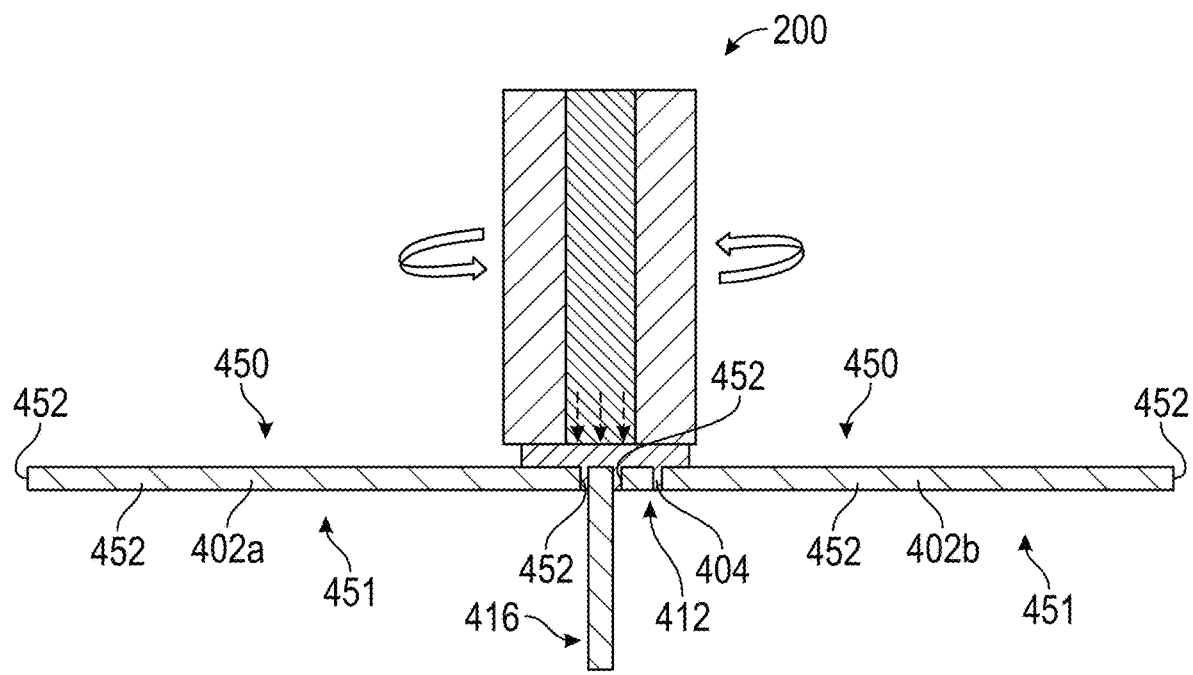
FIG. 15A is a cross-sectional view of two parts being joined together with a preformed stiffener and formation of in-situ rivets using friction stir additive manufacturing devices and methods according to the present disclosure.
Figure 15B:
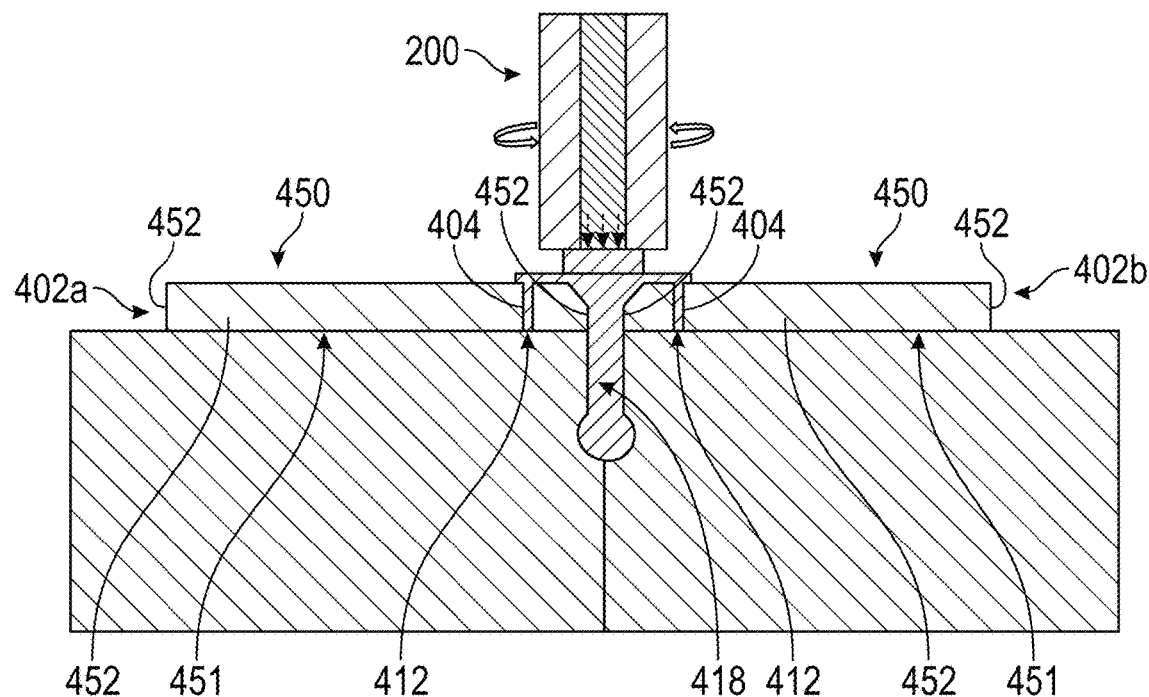
FIG. 15B is a cross-sectional view of two parts being joined together while forming an integrated stiffener and in-situ rivets using friction stir additive manufacturing devices and methods according to the present disclosure.
Figure 15C:
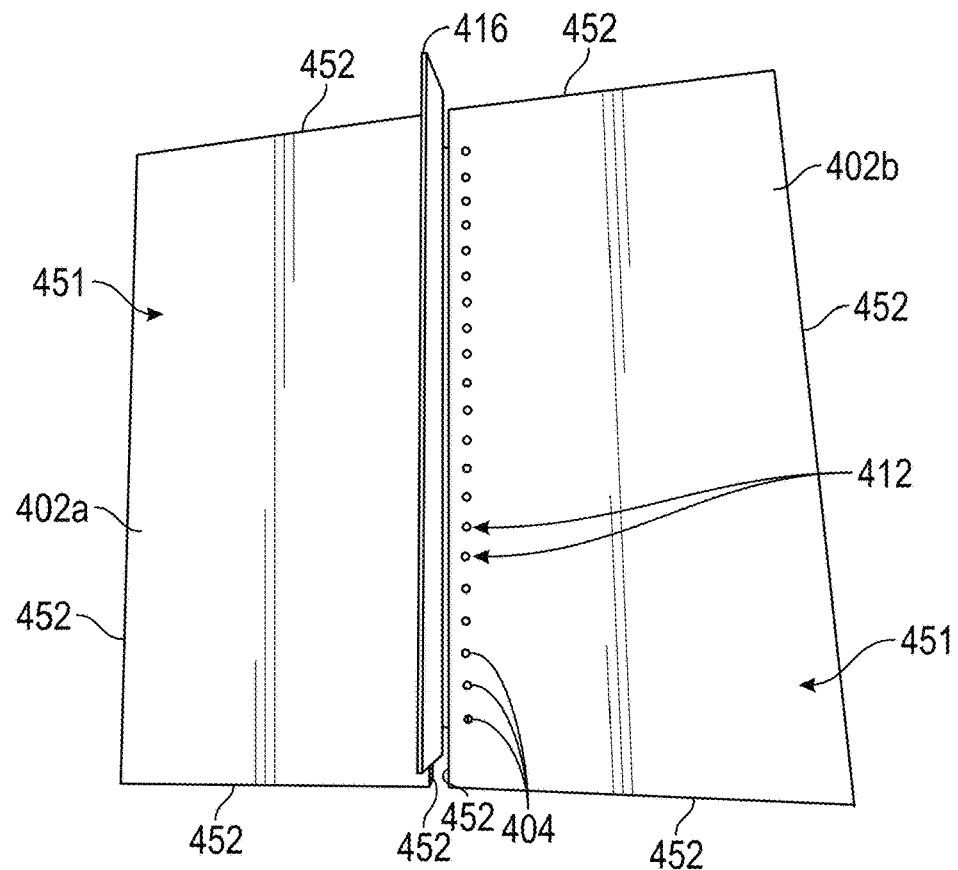
FIG. 15C is a bottom view of two parts and a preformed stiffener joined together after formation of in-situ rivets using friction stir additive manufacturing devices and methods according to the present disclosure.
Figure 15D:
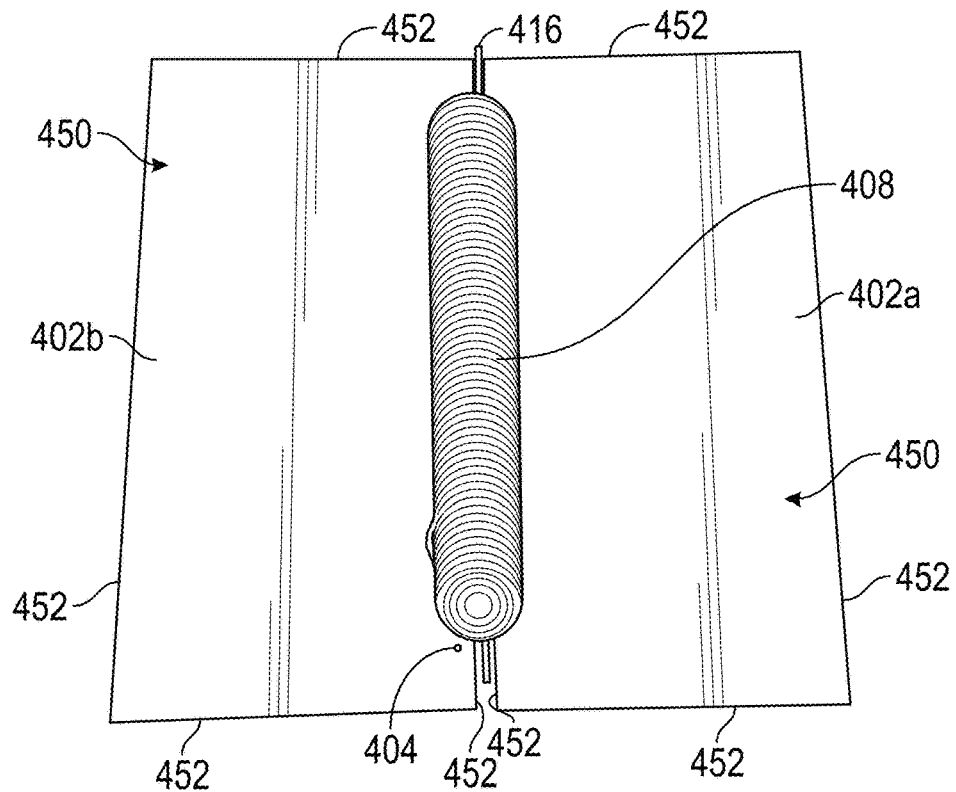
FIG. 15D is a top view of FIG. 15C.

FIG. 15A illustrates a cross-sectional view of a friction stir additive manufacturing device 200 being used to join two parts or work-pieces 402a, 402b, and a preformed stiffener 416, while concurrently forming one or more in-situ rivets 412. FIG. 15B illustrates a cross-sectional view of the friction stir additive manufacturing device 200 being used to join two parts 402a, 402b while concurrently forming an integrated stiffener 418 and a plurality of in-situ rivets 412. The integrated stiffener 418 and the in-situ rivets 412 can be formed by the filler material exiting the friction stir additive manufacturing device 200. FIG. 15C illustrates a bottom view of the two parts 402a, 402b and preformed stiffener 416 of FIG. 15A after being joined and after the in-situ rivets 412 have been formed. FIG. 15D illustrates a top view of the two parts 402a, 402b and preformed stiffener 416 of FIG. 15A after being joined and after the in-situ rivets 412 have been formed. The friction stir additive manufacturing device 200 can be any friction stir additive manufacturing device according to embodiments of the present disclosure.

One or both parts 402a, 402b can include a plurality of through holes 404 according to embodiments of the present disclosure. For example, FIG. 15A illustrates one part 402b having a plurality of through holes 404, while FIG. 15B illustrates both parts 402a, 402b having a plurality of through holes 404. FIGS. 15A and 15B are cross-sections and therefore only show, at most, one hole on a part. However, the plurality of holes 404 filled with filler material are visible in FIG. 15C. An in-situ rivet is formed when filler material that is deposited into a through hole 404 solidifies. In some cases, filler material is not deposited in a through hole 404 to form an in-situ rivet. For example, as shown in FIGS. 15C and 15D, the filler material has filled all but one through hole 404a, while also securing the parts 402a, 402b and the stiffener 416 together.

As shown in FIGS. 15A and 15B the friction stir additive manufacturing device 200 can be used to join together parts 402a and 402b. Each part 402a, 402b can have a top surface 450 that faces the friction stir additive manufacturing device 200. Each part 402a, 402b can have a bottom surface 451 opposite the top surface 450 that faces away from the friction stir manufacturing device 200. Each part 402a, 402b can have at least one surface 452 that connects the top surface 450 and the bottom surface 451. A side surface 452a of the first part 402a can be positioned adjacent a side surface 452b of the second part 402b. It will be understood that devices and methods for forming in-situ rivets according to embodiments of the present disclosure can be suitably implemented in various kinds of parts having many different shapes, including but not limited to substantially planar parts 402a, 402b.

One or both of the parts 402a, 402b can have a plurality of preformed through holes 404. For example, as shown in FIG. 15A only one part, part 402b, includes a plurality of through holes 404, while in FIG. 15B both parts 402a, 402b includes a plurality of through holes 404. The plurality of through holes 404 can extend through the part 402a, 402b from the top surface 450 to the bottom surface 451. Each through hole 404 can have a first opening on the top surface 450, a second opening on the bottom surface 451, and a passageway through the part 402a, 402b between the first opening and the second opening. In some embodiments, the through holes 404 can extend only partially through the thickness of the parts 402a, 402b, for example from the top surface 450 but not all the way to the bottom surface 451 or from the bottom surface 451 but not all the way to the top surface 450. The through holes 404 can extend halfway through the parts 402a, 402b.

The plurality of through holes 404 can extend along or next to the side surface 452a, 452b of the parts 402a, 402b. The plurality of through holes 404 can extend along an axis generally parallel to and offset a distance from a weld line (for example, a weld line 408 described below). The plurality of through holes 404 can extend the entire length of the side surface 452a, 452b, or only a portion of the length of the side surface 452a, 452b. The plurality of through holes 404 can be positioned at predetermined positions such that the spacing between the through holes 404 is consistent or such that the spacing between the through holes 404 varies. The through holes 404 can have a diameter from about 0.05 inches to about 0.25 inches, for example, about 0.05 inches, about 0.10 inches, about 0.15 inches, about 0.20 inches, about 0.25 inches or any value in between. The diameter of the through holes 404 can be adjusted in view of the filler material and the thickness of the parts 402a, 402b. A distance between a center point of a through hole 404 and an edge of the part in which the through hole 404 is formed (for example, a side surface 452a, 452b described below) can be 1 to 2 times the diameter of the through hole 404. For example, in one non-limiting embodiment, the diameter of a through hole 404 is about 0.20 inches, and the distance between the center point of the through hole 404 and an edge of the part in which the through hole 404 is formed is about 0.20 to about 0.40 inches. It will be understood that these diameters and distances are illustrative and other diameters and distances can be suitably implemented in accordance with embodiments of the present disclosure.

The parts 402a, 402b can be spaced apart a predetermined distance such that a side surface 452a of the first part 402a is facing the side surface 452b of the second part 402b. As illustrated in the non-limiting example of FIGS. 15A and 15B, the side surfaces 452a, 452b can face each other. In some embodiments, the side surfaces 452a, 452b of the parts 402a, 402b can be positioned such that they abut or touch. In some embodiments, the side surfaces 452a, 452b can be positioned such that they do not contact each other. In some embodiments, the side surfaces 452a, 452b can be positioned such that they are in indirect contact with each other. For example, a preformed stiffener can be positioned between the side surfaces 452a, 452b of the parts 402a, 402b. The parts 402a, 402b can be positioned such that the top surface 405 of one part does not an overlap with a bottom surface 452 of the other part.

Any suitable friction stir additive manufacturing device, including but not limited to the friction stir additive manufacturing device 200 with a deposition head 208 as described herein with reference to FIGS. 6-12, can apply the filler material to the parts 402a, 402b. As the friction stir additive manufacturing device 200 is advanced across or above the top surface 450 of the parts 402a, 402b the filler material can fill the space between the parts 402a, 402b to join the parts 402a, 402b and form a weld line 408, while concurrently filling the plurality of through holes 404.

The filler material can form the weld line 408, as shown in FIG. 15D, at or near the side surfaces 452a, 452b of the parts 402a, 402b that are spaced apart or abutted. A portion of the weld line 408 can be positioned on the top surfaces 450 of the parts 402a, 402b. In some embodiments, a portion of the weld line 408 can extend in between the side surfaces 452a, 452b of the parts 402a, 402b. The filler material can extend into an area between the parts 402a, 402b and/or around the stiffener 416 as the friction stir additive manufacturing device is advanced. While forming the weld line 408, the filler material can spread outward away from the side surfaces 452a, 452b to also fill one or more of the plurality of through holes 404. For example, as shown in FIG. 15D, at least one through hole 404a has not been filled by the filler material. The filler material can then solidify or harden within the plurality of through holes 404, thus forming a plurality of in-situ rivets 412. The filler material can also solidify within the area between side surfaces 452a, 452b of the parts, thus joining the parts 402a, 402b and the stiffener 416.

In-situ rivets 412 according to embodiments of the present disclosure can strengthen the weld and connection between the two parts 402a, 402b. For example, the in-situ rivets 412 can prove beneficial in instances where two parts are formed of different materials. For example, a first part can be formed of or contain aluminum while a second part can be formed of or contain stainless steel. The filler material can be aluminum, and as such the bond between the aluminum filler material and the stainless steel part may not be as strong as the bond between the aluminum filler material and the aluminum part. Thus, devices and methods of the present disclosure that form in-situ rivets in at least the stainless steel part can increase the strength of the bond between the aluminum filler material and the stainless steel part.

Devices and methods for forming in-situ rivets in accordance with embodiments of the present disclosure can join preformed stiffeners to parts, or form integrated stiffeners that are joined to parts, concurrent with formation of the in-situ rivets. For example, as shown in FIG. 15A, a preformed stiffener 416 can be positioned between the side surfaces 452a, 452b of the two parts 402a, 402b prior to advancing the friction stir additive manufacturing device 200 across or above the top surfaces 450 of the parts 402a, 402b. As the weld line 408 is formed, the filler material solidifies around the preformed stiffener 416, securing the stiffener in place while joining the two parts 402a, 402b and forming the in-situ rivets 412.

Alternatively, the friction stir additive manufacturing device 200 can simultaneously join or form an integrated stiffener as described herein, while forming the in-situ rivets 412. For example, as shown in FIG. 15B and described above with reference to FIGS. 14A-14C, an integrated stiffener 418 can be formed while the weld line 408 and the plurality of in-situ rivets are being formed.

Advantageously, devices and methods of the present disclosure can implement one or more of the advantageous features described herein, in any combination. For example, embodiments of the present disclosure can join parts using friction stir additive manufacturing devices and methods that incorporate a deposition head (for example, a deposition head 208), include formation of one or more in-situ rivets (for example, in-situ rivets 412), and/or join stiffeners to work-pieces and/or create stiffeners between joined work-pieces (for example, preformed stiffener 416 and/or integrated stiffener 418 formed between parts 402a, 402b). In one non-limiting example, a friction stir additive manufacturing device having a deposition head according to the present disclosure can be used to join two parts or work-pieces while forming in-situ rivets and/or joining/forming stiffeners according to the present disclosure.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities, dimensions, and so forth used in the specification and claims are to be understood as being modified in all instances by the term "about." Accordingly, unless indicated to the contrary, the numerical parameters set forth in the specification are approximations that may vary depending upon the desired properties sought to be obtained by embodiments of the present disclosure. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of ±1%, ±5%, ±10%, or ±20%.

The above description discloses several devices, methods, and materials of the present disclosure. The present disclosure is susceptible to modifications in the devices, methods, and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A friction stir additive manufacturing device configured to join a first work-piece and a second work-piece, the device comprising:
    a spindle configured to rotate about a central axis, the spindle comprising a channel extending from a first end of the spindle to a second end of the spindle, the channel configured to allow a filler material to pass through the spindle from the first end towards the second end, the spindle further configured to deposit the filler material over a weld line as the device is advanced along an interface between the first work-piece and the second work-piece; and
    a deposition head configured to receive at least a portion of the second end of the spindle, the deposition head configured to remain stationary relative to the rotating spindle, the deposition head comprising:
        a first semi-cylindrical portion having an inner radius and an outer radius relative to a first axis, and
        a second semi-cylindrical portion having an inner radius and an outer radius relative to a second axis that is perpendicular to the first axis, the second semi-cylindrical portion having a chamfered inner surface configured to define a weld profile.

2. The device of claim 1, further comprising a clearance between the deposition head and the spindle.

3. The device of claim 2, wherein the clearance is between about 0.0005 inches and about 0.01 inches.

4. The device of claim 1, wherein the first and second semi-cylindrical portions are integral.

5. The device of claim 1, wherein the deposition head is removably coupled to the spindle.

6. The device of claim 1, wherein the second end of the spindle is closer to the weld line than the inner surface of the second semi-cylindrical portion.

7. The device of claim 1, wherein the first and second portions of the deposition head form an open space configured to receive the spindle.

8. The device of claim 1, wherein a trailing surface of the first semi-cylindrical portion is coupled to a leading surface of the second semi-cylindrical portions.

9. The device of claim 1, wherein the inner radius of the second semi-cylindrical portion varies.

10. The device of claim 1, wherein the semi-cylindrical first portion has a surface configured to contact the weld line, the surface transitioning to the outer radius via a curved edge.

11. A deposition head for friction stir additive manufacturing, the deposition head comprising:
   a first semi-cylindrical portion having a first end surface and a second end surface, the first end surface configured to contact a first part and a second part, the first and second end surfaces connected by an inner curved surface and an outer curved surface, the curved surfaces extending a length along a first axis and defining a first side surface and a second side surface; and
   a second semi-cylindrical portion having a first end surface and a second end surface, the first and second end surfaces connected by an inner curved surface and an outer curved surface, the curved surfaces extending a length along a second axis perpendicular to the first axis, the curved surfaces defining a first side surface and a second side surface, the first side surface configured to contact the first part and the second side surface configured to contact the second part,
   the first semi-cylindrical portion and the second semi-cylindrical portion further configured to define an open space to receive a rotating spindle to deposit a filler material to join the first part and the second part, the inner curved surface of the second semi-cylindrical portion configured to define a weld profile along a weld line.

12. The deposition head of claim 11, wherein the first and second side surfaces of the first semi-cylindrical portion contact the first end surface of the second semi-cylindrical portion.

13. The deposition head of claim 11, wherein the first end surface of the first semi-cylindrical portion transitions to the outer curved surface via a curved edge.

14. The deposition head of claim 11, wherein the second semi-cylindrical portion forms a channel extending along the second axis and enclosed by the inner curved surface and surfaces of the first and second parts.

15. The deposition head of claim 14, wherein the channel has an open end defined by the second end surface and is configured to allow the filler material to exit the deposition head.

16. The deposition head of claim 11, wherein the first portion defines half of a diameter of the open space and the second portion defines half of the diameter of the open space, wherein the open space extends along the first axis.

* * * * *